US012023914B2

(12) United States Patent
Anan

(10) Patent No.: US 12,023,914 B2
(45) Date of Patent: Jul. 2, 2024

(54) RECORDING DEVICE BELT AND RECORDING DEVICE

(71) Applicant: KYOCERA Document Solutions Inc., Osaka (JP)

(72) Inventor: Naohiro Anan, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 93 days.

(21) Appl. No.: 17/926,662

(22) PCT Filed: May 10, 2021

(86) PCT No.: PCT/JP2021/017668
§ 371 (c)(1),
(2) Date: Nov. 21, 2022

(87) PCT Pub. No.: WO2021/241183
PCT Pub. Date: Dec. 2, 2021

(65) Prior Publication Data

US 2023/0234380 A1 Jul. 27, 2023

(30) Foreign Application Priority Data

May 26, 2020 (JP) ................................ 2020-091620

(51) Int. Cl.
*B41J 11/42* (2006.01)
*G03G 15/16* (2006.01)

(52) U.S. Cl.
CPC .......... *B41J 11/42* (2013.01); *G03G 15/1605* (2013.01)

(58) Field of Classification Search
CPC ........... B41J 2002/16591; B41J 11/007; B41J 15/048
See application file for complete search history.

(56) References Cited

U.S. PATENT DOCUMENTS

2011/0063353 A1* 3/2011 Takeuchi ............ B41J 2/16526 347/14

FOREIGN PATENT DOCUMENTS

JP 2006-264934 10/2006

* cited by examiner

*Primary Examiner* — Julian D Huffman
(74) *Attorney, Agent, or Firm* — LEX IP MEISTER, PLLC

(57) ABSTRACT

A belt suitable for detection of a meandering amount of the belt and detection of a reference position for one round of the belt is realized with a simple configuration. The recording device belt has a plurality of marks for belt position detection disposed in a transport direction of the belt. Each of the plurality of marks has: a first specific portion whose dimension in the transport direction differs depending on a position in an intersecting direction that intersects with the transport direction; and a second specific portion whose dimension in the transport direction is constant regardless of the position in the intersecting direction. The plurality of marks include a reference mark whose dimension in the transport direction of the second specific portion is different from that of the other marks in the plurality of marks.

15 Claims, 14 Drawing Sheets

Lb<Lc<La

Lmax2<Lmax3<Lmax1

RECORDING DEVICE BELT AND RECORDING DEVICE

TECHNICAL FIELD

The present invention relates to a belt used in a recording device such as an inkjet printer and a copier, and a recording device provided with the belt.

BACKGROUND ART

A recording device such as an inkjet printer is provided with an endless transport belt that transports a sheet of paper to a position facing a recording head. The transport belt is stretched between at least two rollers. When meandering occurs in the transport belt, the meandering can be corrected by inclining one of the rollers according to a meandering amount. A technology for correcting meandering of a transport belt is disclosed, for example, in PTL 1.

CITATION LIST

Patent Literature

PTL 1: Japanese Patent Laid-open No. 2006-264934

SUMMARY OF THE INVENTION

Problems to be Solved by the Invention

In an inkjet printer, there are cases where it is desired to detect a reference position for one round of the transport belt. For example, when paper is tried to be placed at a specific position on the transport belt, if the reference position for the one round of the transport belt can be detected, the paper is fed to the transport belt after a specific period of time elapses from a time point when the reference position is detected, so that the paper can be placed at the specific position.

Considering the meandering correction of the transport belt and the placement of the paper at the specific position on the transport belt as described above, it is desired to realize a transport belt suitable for detecting the meandering amount of the transport belt and detecting the reference position. However, when a transport belt with a complicated configuration is required to detect both of these, the manufacturing cost of the transport belt is increased, which is not desirable. Therefore, it is desirable to realize a transport belt with a simple configuration suitable for detecting the meandering amount and the reference position. However, such a transport belt is not proposed yet.

The detection of the meandering amount and the reference position may be required, for example, in an intermediate transfer belt of a color copier. Therefore, it is desirable to realize a belt with a simple configuration suitable for detecting the meandering amount and the reference position, which can also be applied to the intermediate transfer belt.

In view of the above problem, an object of the present invention is to provide a recording device belt with a simple configuration suitable for detecting a meandering amount of the belt and a reference position for one round of the belt, and a recording device using the belt.

Means for Solving the Problem

In order to achieve the above object, a recording device belt according to an aspect of the present invention has a plurality of marks for belt position detection disposed in a transport direction of the belt. Each of the plurality of marks has: a first specific portion whose dimension in the transport direction differs depending on a position in an intersecting direction that intersects with the transport direction; and a second specific portion whose dimension in the transport direction is constant regardless of the position in the intersecting direction. The plurality of marks include a reference mark whose dimension in the transport direction of the second specific portion is different from that of the other marks in the plurality of marks.

Effect of the Invention

According to the above configuration, it is possible to realize a belt suitable for detecting a meandering amount of the belt and a reference position for one round of the belt, and a recording device using the belt, with a simple configuration.

MODE FOR CARRYING OUT THE INVENTION

1. Configuration of Inkjet Recording Device

Figure 1:
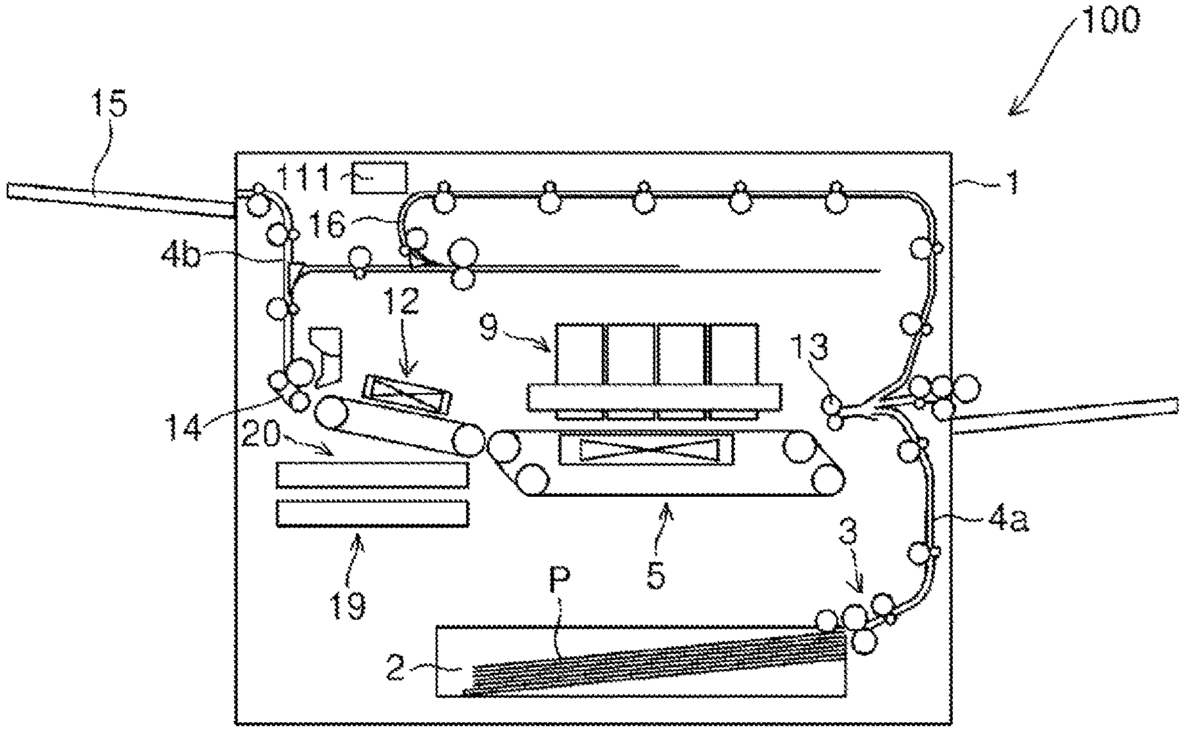
FIG. 1 is an explanatory diagram illustrating a schematic configuration of a printer as an inkjet recording device according to an embodiment of the present invention.

Hereinafter, an embodiment of the present invention will be described with reference to the drawings. FIG. 1 is an explanatory diagram illustrating a schematic configuration of a printer 100 as an inkjet recording device according to the embodiment of the present invention. The printer 100 includes a paper-feed cassette 2 as a paper housing part. The paper-feed cassette 2 is disposed in a lower portion of a printer body 1. Paper P, which is an example of a recording medium, is housed inside the paper-feed cassette 2.

A paper feeder 3 is disposed on the downstream side in the paper transport direction of the paper-feed cassette 2, that is, above the right side of the paper-feed cassette 2 in FIG. 1. By this paper feeder 3, the paper P is separated and fed one by one toward the upper right side of the paper-feed cassette 2 in FIG. 1.

The printer 100 includes a first paper transport path 4*a* therein. The first paper transport path 4*a* is located on the upper right side in the paper-feed direction with respect to the paper-feed cassette 2. The paper P fed from the paper-feed cassette 2 is transported vertically upward along a side surface of the printer body 1 by the first paper transport path 4*a*.

A resist roller pair 13 is provided at a downstream end of the first paper transport path 4*a* in the paper transport direction. Furthermore, a first transport unit 5 and a recording unit 9 are disposed in the immediate vicinity on the downstream side in the paper transport direction of the resist roller pair 13. The paper P fed from the paper-feed cassette 2 reaches the resist roller pair 13 through the first paper transport path 4*a*. The resist roller pair 13 measures timing of ink ejection operation performed by the recording unit 9 and feeds the paper P toward the first transport unit 5 while correcting diagonal feed of the paper P.

The paper P fed out to the first transport unit 5 is transported to a position facing the recording unit 9 (especially recording heads 17*a* to 17*c* described later) by a first transport belt 8 (see FIG. 2). Ink is ejected onto the paper P from the recording unit 9, so that and an image is recorded on the paper P. At this time, the ink ejection in the recording unit 9 is controlled by a control unit 111 in the printer 100. The control unit 111 is composed of, for example, a CPU (Central Processing Unit).

A second transport unit 12 is disposed on the downstream side (left of FIG. 1) of the first transport unit 5 in the paper transport direction. The paper P with an image recorded by the recording unit 9 is transported to the second transport unit 12. The ink ejected on a surface of the paper P is dried while passing through the second transport unit 12.

A decurler unit 14 is provided near a left side surface of the printer body 1 on the downstream side of the second transport unit 12 in the paper transport direction. The paper P with ink dried by the second transport unit 12 is transported to the decurler unit 14, and curling of the paper P is uncurled.

A second paper transport path 4*b* is provided on the downstream side (upper side of FIG. 1) of the decurler unit 14 in the paper transport direction. The paper P that passes through the decurler unit 14 passes through the second paper transport path 4*b* and is discharged to the paper discharge tray 15 provided outside the left side surface of the printer 100 when double-sided recording is not performed.

A reverse transport path 16 for the double-sided recording is provided at a position in an upper portion of the printer body 1 and above the recording unit 9 and the second transport unit 12. When the double-sided recording is performed, the paper P, recording on one surface (a first surface) of which is completed, and which passes through the second transport unit 12 and the decurler unit 14, is transported to the reverse transport path 16 through the second paper transport path 4*b*.

The transport direction of the paper P transported to the reverse transport path 16 is then switched for subsequent recording on the other surface (a second surface) of the paper P. Then, the paper P passes through the upper portion of the printer body 1, is transported rightward, and is transported again to the first transport unit 5 in a state in which the second surface faces upward via the resist roller pair 13. In the first transport unit 5, the paper P is transported to the position facing the recording unit 9, and an image is recorded on the second surface by the ink ejection from the recording unit 9. The paper P after the double-sided recording is discharged to the paper discharge tray 15 via the second transport unit 12, the decurler unit 14, and the second paper transport path 4*b* in this order.

A maintenance unit 19 and a cap unit 20 are disposed below the second transport unit 12. The maintenance unit 19 moves horizontally at a position below the recording unit 9 when purging, wipes the ink pushed out of an ink ejection port of the recording head, and collects the wiped ink. The purging refers to operation to forcibly push out the ink from the ink ejection port of the recording head in order to discharge thickened ink, a foreign substance, or air bubbles in the ink ejection port. The cap unit 20 moves horizontally at the position below the recording unit 9 when capping an ink ejection surface of the recording head, further moves upward, and is mounted on a lower surface of the recording head.

Figure 2:
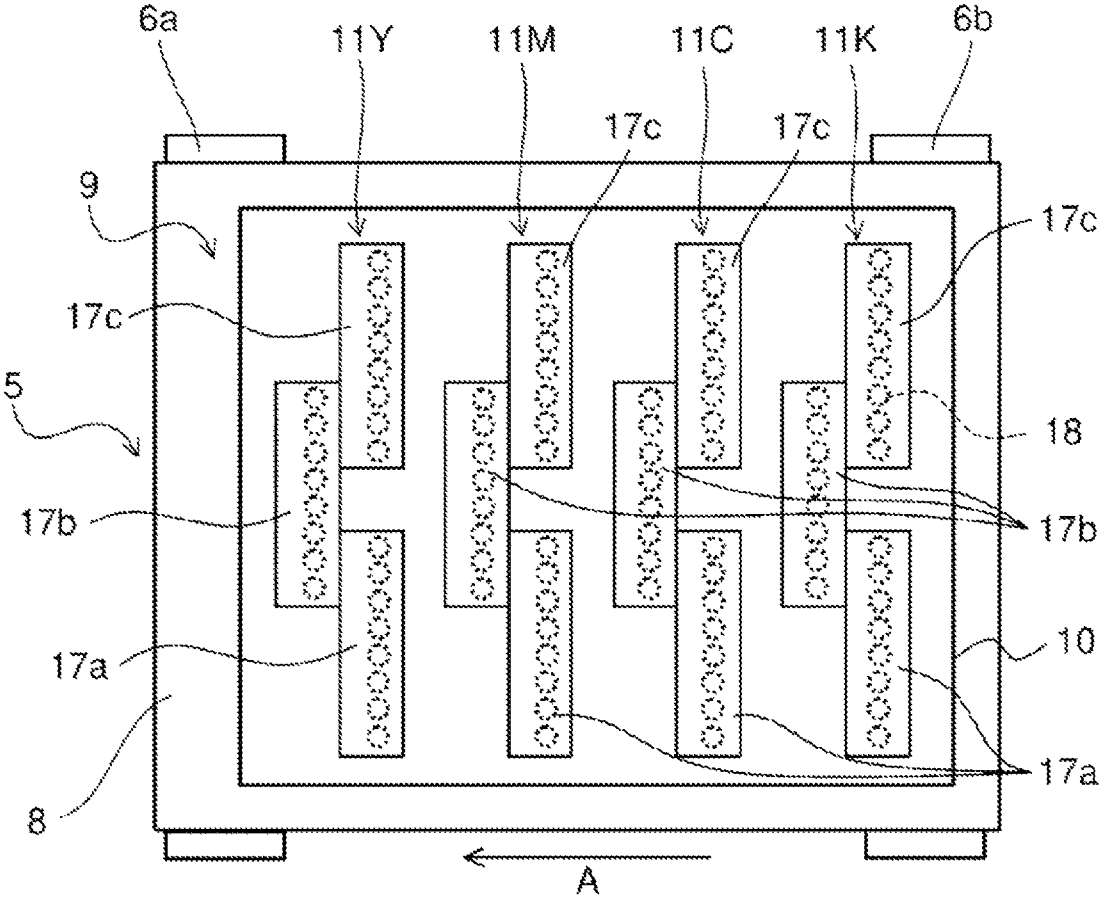
FIG. 2 is a plan view of a recording unit provided in the above printer.

FIG. 2 is a plan view of the recording unit 9. The recording unit 9 includes a head housing 10, and line heads 11Y, 11M, 11C and 11K. The line heads 11Y to 11K are held by the head housing 10 in such a height that is formed with a specific interval (for example, 1 mm) from a transport surface of the endless first transport belt 8 that is stretched around a plurality of rollers including a drive roller 6*a*, a driven roller 6*b*, and tension rollers 7 (see FIG. 3). In addition, the line heads 11Y to 11K are arranged in this order from the downstream side toward the upstream side in the moving direction of the first transport belt 8.

The line heads 11Y to 11K each have a plurality of (three herein) the recording heads 17*a* to 17*c*. The recording heads 17*a* to 17*c* are arranged in a staggered manner along a paper width direction (arrow BB' direction) that is orthogonal to the paper transport direction (arrow A direction). The recording heads 17*a* to 17*c* have a plurality of ink ejection ports 18 (nozzle). The ink ejection ports 18 are aligned at equal intervals in the width direction of each of the recording heads 17*a* to 17*c*, that is, the paper width direction (arrow BB' direction). The ink in each color of yellow (Y), magenta (M), cyan (C), and black (K) is ejected onto the paper P transported by the first transport belt 8, from each of the line heads 11Y to 11K via the ink ejection ports 18 of the recording heads 17*a* to 17*c*.

Figure 3:
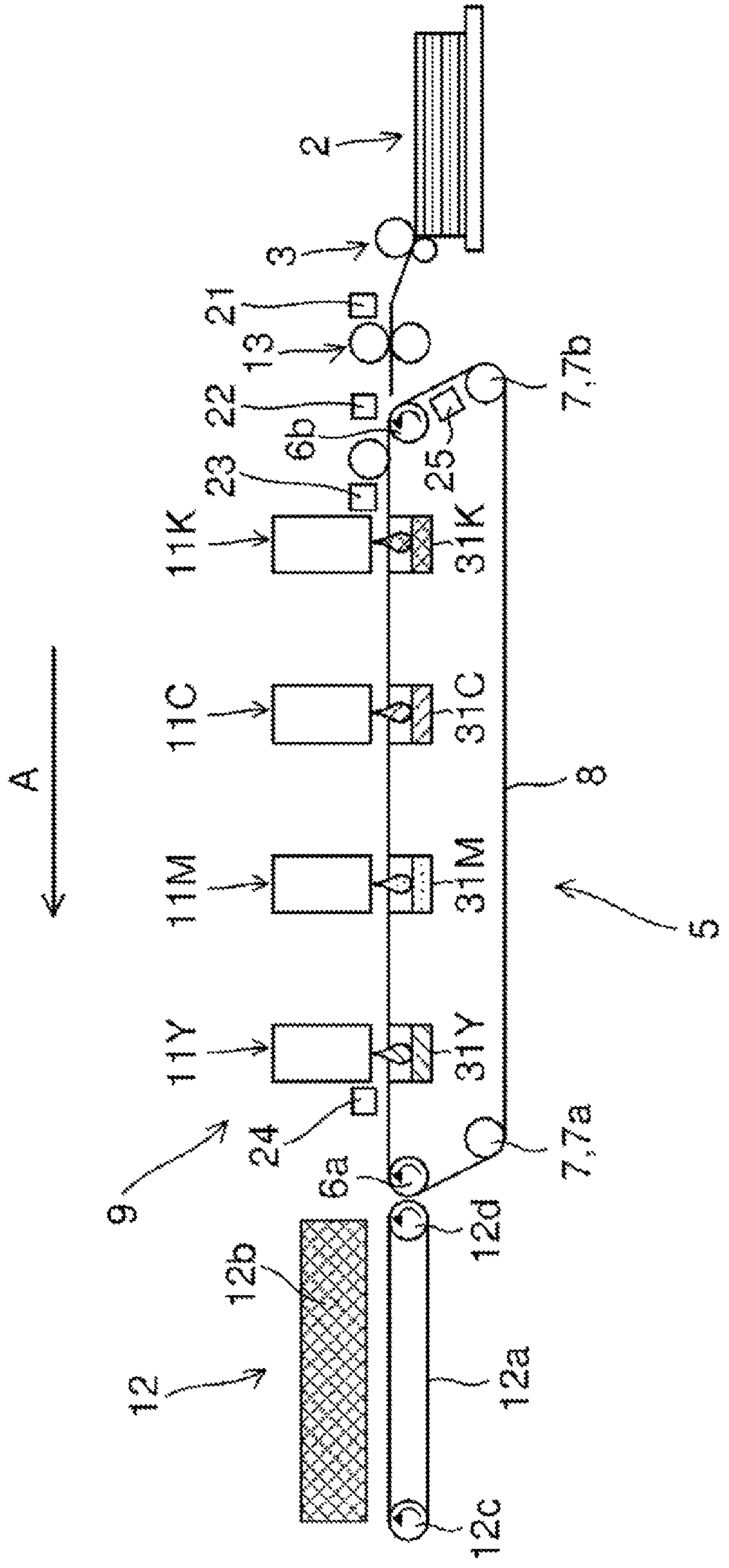
FIG. 3 is an explanatory diagram schematically illustrating a peripheral configuration of a transport path of paper reaching a second transport unit through a first transport unit from a paper-feed cassette of the above printer.

FIG. 3 schematically illustrates a peripheral configuration of the transport path of the paper P which reaches the second transport unit 12 through the first transport unit 5 from the paper-feed cassette 2. The above tension rollers 7 include a tension roller 7*a* located on the upstream side, and a tension roller 7*b* located on the downstream side. The tension roller 7*a*, the tension roller 7*b*, the driven roller 6*b*, the drive roller 6*a* are arranged in this order in the moving direction (circulating direction) of the first transport belt 8.

The printer 100 has ink receiving units 31Y, 31M, 31C, 31K on an inner circumferential surface side of the first transport belt 8. When the recording heads 17*a* to 17*c* perform flushing, the ink receiving units 31Y to 31K receive and collect the ink that is ejected from the recording heads 17*a* to 17*c* and passes through openings 80 (see FIG. 6) of opening groups 82, which will be described later, of the first transport belt 8. Accordingly, the ink receiving units 31Y to 31K are provided at positions facing the recording heads 17*a* to 17*c* of the line heads 11Y to 11K via the first transport belt 8, respectively. The ink that is collected in the ink receiving units 31Y to 31K is sent to a waste ink tank and is discarded, for example, but may not be discarded and may be reused.

Herein, flushing means that ink is ejected at a timing different from a timing that contributes to image formation (image recording) on the paper P for the purpose of reducing or preventing clogging of the ink ejection ports 18 due to drying of ink. The control unit 111 controls conduction of flushing in the recording heads 17*a* to 17*c*.

The above second transport unit 12 is configured to include a second transport belt 12*a* and a drier 12*b*. The second transport belt 12*a* is stretched by two of a drive roller 12*c* and a driven roller 12*d*. The paper P, which is transported by the first transport unit 5, and on which an image is recorded by the ink ejection by the recording unit 9, is transported by the second transport belt 12*a*, is dried by the drier 12*b* during the transport, and is then transported to the above decurler unit 14.

Figure 4:
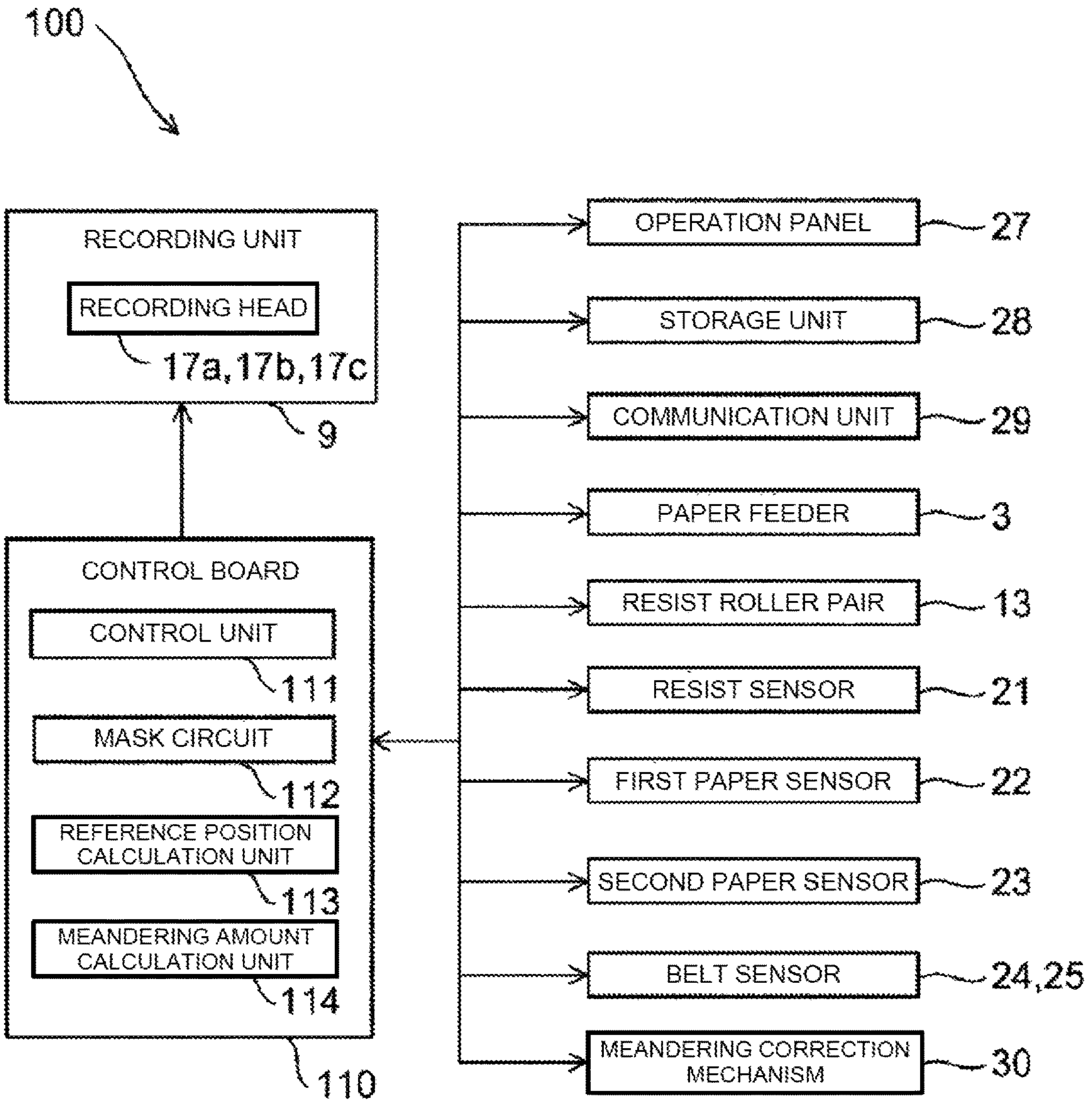
FIG. 4 is a block diagram illustrating a hardware configuration of a main part of the above printer.

FIG. 4 is a block diagram illustrating a hardware configuration of a main part of the printer 100. In addition to the above configuration, the printer 100 further includes a resist sensor 21, a first paper sensor 22, a second paper sensor 23, belt sensors 24 and 25, and a meandering correction mechanism 30.

The resist sensor 21 detects the paper P transported from the paper-feed cassette 2 by the paper feeder 3 and fed to the resist roller pair 13. The control unit 111 can control rotation start timing of the resist roller pair 13 on the basis of detection results by the resist sensor 21. For example, on the basis of the detection results by the resist sensor 21, the control unit 111 can control feed timing of the paper P to the first transport belt 8 after skew (incline) correction by the resist roller pair 13.

The first paper sensor 22 is a line sensor that detects a position in the width direction of the paper P fed from the resist roller pair 13 to the first transport belt 8. The control unit 111 can cause ejection of ink from the ink ejection ports 18, which correspond to the width of the paper P, among the ink ejection ports 18 in the recording heads 17*a* to 17*c* of the line heads 11Y to 11K, on the basis of detection results by the first paper sensor 22, so that an image is recorded on the paper P.

The second paper sensor 23 is a detection sensor that detects passage of the paper P fed to the first transport belt 8 by the resist roller pair 13 as a recording medium feed unit. That is, the second paper sensor 23 detects a position in the transport direction of the paper P that is transported by the first transport belt 8. The second paper sensor 23 is located on the upstream side of the recording unit 9 and on the downstream side of the first paper sensor 22 in the paper transport direction. The control unit 111 can control ink ejection timing onto the paper P that reaches a position facing the line heads 11Y to 11K (recording heads 17*a* to 17*c*) by the first transport belt 8, on the basis of the detection results by the second paper sensor 23.

The belt sensors 24 and 25 are transmissive or reflective optical sensors that detect the marks 90 (see FIG. 6) provided on the first transport belt 8. The belt sensor 24 is located on the downstream side of the recording unit 9 in the paper transport direction (moving direction of the first transport belt 8) and on the upstream side with respect to the drive roller 6*a*. The belt sensor 25 is located between the driven roller 6*b* and the tension roller 7*b* that stretch the first transport belt 8. The driven roller 6*b* is located on the upstream side in the moving direction of the first transport belt 8 with respect to the recording unit 9. The belt sensor 24 may combine the same function as the second paper sensor 23. The control unit 111 can control the resist roller pair 13 so as to feed the paper P to the first transport belt 8 at specific timing, on the basis of the detection results by the belt sensor 24 or 25. An example of feed control of the paper P will be described below.

The paper position is detected by a plurality of sensors (e.g., the second paper sensor 23 and the belt sensor 24), and the marks 90 are detected by a plurality of sensors (e.g., the belt sensors 24 and 25), so that it is also possible to perform error correction of detected positions and to detect abnormality.

The first paper sensor 22 and the second paper sensor 23 described above may be transmissive or reflective optical sensors. The belt sensors 24 and 25 may be CIS sensors (Contact Image Sensors). The belt sensor 25 is located so as to face the inner circumferential surface of the first transport belt 8, as illustrated in FIG. 3, but may also be locates so as to face the outer circumferential surface of the first transport belt 8, like the belt sensor 24. The installation position of the belt sensor 25 is not limited to the position between the driven roller 6*b* and the tension roller 7*b*. For example, the installation position of the belt sensor 25 may be a position between the tension rollers 7*a* and 7*b*, or a position between the drive roller 6*a* and the tension roller 7*a*.

The meandering correction mechanism 30 is a mechanism that corrects meandering of the first transport belt 8 by inclining a rotary shaft of the roller (e.g., the tension roller 7*b*) that stretches the first transport belt 8. Specific drive of the meandering correction mechanism 30 is controlled by the control unit 111. The meandering correction mechanism

30 has, for example, a bearing section supporting the above rotary shaft and a moving mechanism (including a motor, a cam, and the like) that moves the bearing section in such a direction as to intersect the above rotary shaft.

The printer 100 further includes an operation panel 27, a storage unit 28, and a communication unit 29. The operation panel 27 is an operation unit for accepting input of various settings by a user. For example, the user can operate the operation panel 27 to input the size of the paper P to be set in the paper-feed cassette 2, that is, information such as the size of the paper P to be transported by the first transport belt 8, and the number of sheets of the paper to be printed.

The storage unit 28 is a memory that stores an operation program for the control unit 111 and stores various types of information, and is configured to include a read only memory (ROM), a random access memory (RAM), a non-volatile memory, or the like. The storage unit 28 stores information that is set by using the operation panel 27 (for example, information on the size of the paper P).

The communication unit 29 is a communication interface used to exchange information with an external device (for example, a personal computer (PC)). For example, when the user operates the PC and transmits a print command together with image data to the printer 100, the image data and the print command are input to the printer 100 via the communication unit 29. In the printer 100, the control unit 111 causes the recording heads 17*a* to 17*c* to eject the ink on the basis of the above image data, so that an image can be recorded on the paper P.

The printer 100 includes a control board 110. The control board 110 has a control unit 111, a mask circuit 112, a reference position calculation unit 113, and a meandering amount calculation unit 114. The control unit 111, the mask circuit 112, the reference position calculation unit 113 and the meandering amount calculation unit 114 may be configured in the same CPU, but may be configured in a separate CPU.

The control unit 111 is a main controller that controls operation of the various units of the printer 100. For example, the control unit 111 controls ejection of ink by the recording heads 17*a* to 17*c*, and feed of the paper P to the first transport belt 8 by the resist roller pair 13.

Figure 5:
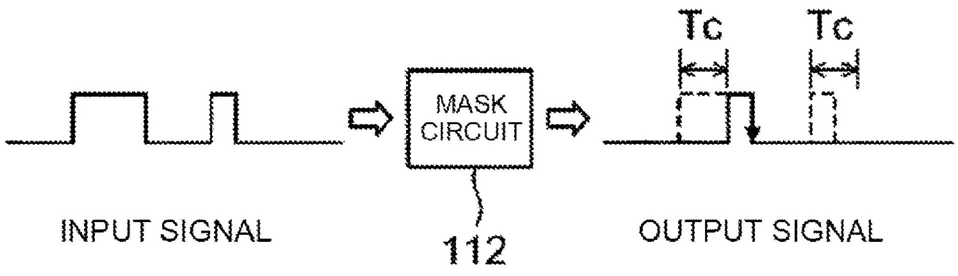
FIG. 5 is an explanatory diagram illustrating an example of an input signal and an output signal for a mask circuit provided in the above printer.

The mask circuit 112 is a processing circuit that extracts and outputs, as valid pulses, signals for a specific period or longer from the detection signals of the plurality of marks 90 output from the belt sensor 25, for example. For example, when the detection signals illustrated in FIG. 5 from the belt sensor 25 is input to the mask circuit 112, the mask circuit 112 masks a high level signal and outputs a low level signal until a specific period Tc (sec) elapses from rise of the input signal. When the specific period Tc elapses, the mask is unmasked and the signal is output at a level after the above time point. In the output signal from the mask circuit 112, a down-edge signal of an extracted valid pulse becomes a reference signal for one round of the belt.

The reference position calculation unit 113 obtains a reference position for one round of the first transport belt 8 on the basis of the signal output from the mask circuit 112. A specific method of obtaining the above reference position will be described below. The reference position calculation unit 113 may obtain the reference position for the one round of the first transport belt 8 on the basis of the detection signals of the plurality of marks 90 directly output from the belt sensor 25.

The meandering amount calculation unit 114 obtains the meandering amount (amount of leaning) of the first transport belt 8 on the basis of detection results of the plurality of marks 90 by the belt sensor 25, for example. The control unit 111 causes the meandering correction mechanism 30 to correct the meandering of the first transport belt 8 on the basis of the meandering amount obtained by the meandering amount calculation unit 114.

2. Details of First Transport Belt (2-1. Configuration Example of First Transport Belt)

Figure 6:
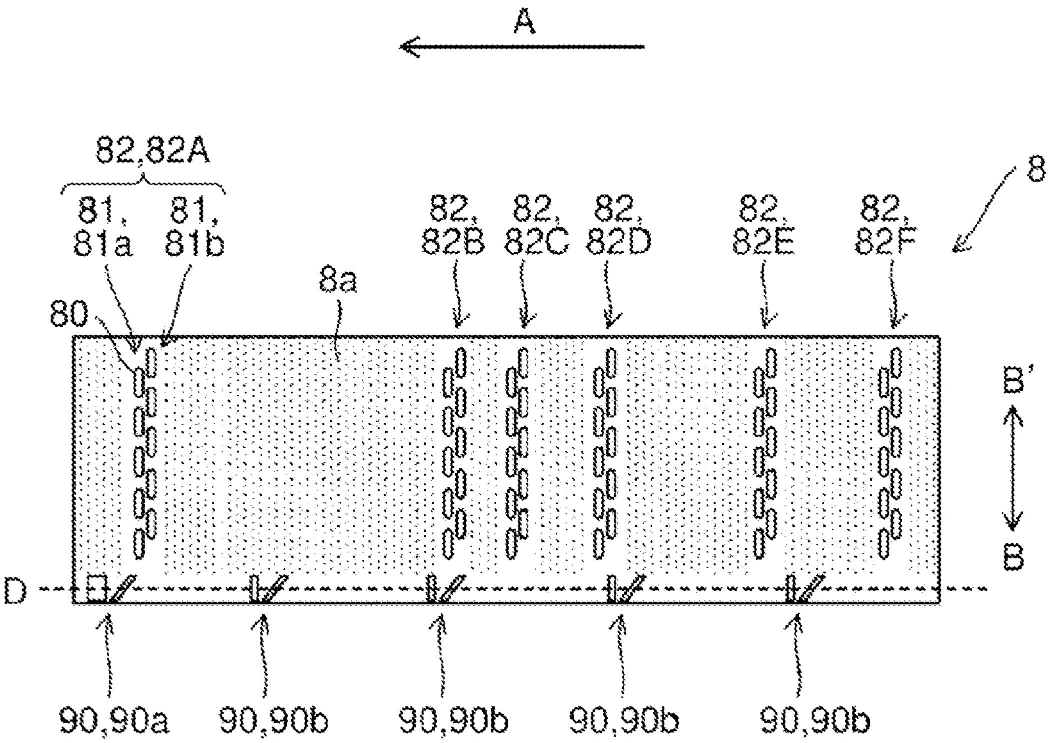
FIG. 6 is a plan view illustrating a configuration example of a first transport belt that has the above first transport unit.

Now, details of the first transport belt 8 of the first transport unit 5 will be described. FIG. 6 is a plan view illustrating a configuration example of the first transport belt 8. In this embodiment, a negative-pressure suction method of suctioning and transporting the paper P onto the first transport belt 8 by negative-pressure suction is adopted. Therefore, the first transport belt 8 is provided with innumerable suction holes 8*a* through each of which suction air generated by the negative-pressure suction passes.

The first transport belt 8 is also provided with the opening groups 82. Each of the opening groups 82 is a set of the openings 80, through each of which the ink ejected from each of the nozzles (the ink ejection ports 18) of the recording heads 17*a* to 17*c* passes during the flushing. The opening area of the single opening 80 is larger than the opening area of the single suction hole 8*a*. The first transport belt 8 has a plurality of the opening groups 82 in the transport direction (A direction) of the paper P in one cycle, and has the six opening groups 82 in this embodiment. The one cycle means a period in which the first transport belt 8 makes one round. When the opening groups 82 are distinguished from each other, the six opening groups 82 are referred to as opening groups 82A to 82F from the downstream side in the A direction. The above suction holes 8*a* are located between the opening group 82 and the opening group 82 that are adjacent to each other in the A direction. That is, in the first transport belt 8, the suction holes 8*a* are not formed around the openings 80 in the opening groups 82.

The opening groups 82 are irregularly located in the A direction in one cycle of the first transport belt 8. That is, in the A direction, intervals between adjacent opening groups 82 and 82 are not constant, but vary (there are at least two types of intervals). At this time, a maximum interval between the two adjacent opening groups 82 in the A direction (for example, an interval between the opening group 82A and the opening group 82B in FIG. 6) is longer than the length in the A direction of the paper P at the time when the paper P with the minimum printable size (for example, A4 size (horizontally placed)) is placed on the first transport belt 8.

The above opening groups 82 have opening rows 81. Each opening row 81 is configured by aligning the plurality of openings 80 in the belt width direction (the paper width direction, the BB' direction) that is orthogonal to the A direction. The single opening group 82 has at least the one opening row 81 in the A direction, and has the two opening rows 81 in this embodiment. When the two opening rows 81 are distinguished from each other, one of the opening rows 81 is set as an opening row 81*a*, and the other is set as an opening row 81*b*.

In the single opening group 82, the openings 80 in any of the opening rows 81 (for example, the opening row 81*a*) are shifted in the BB' direction from the openings 80 in the other opening row 81 (for example, the opening row 81*b*) and are located so as to partially overlap the openings 80 in the other opening row 81 (for example, the opening row 81*b*) when seen in the A direction. In addition, in each of the opening rows 81, the plurality of openings 80 are located at equal intervals in the BB' direction.

The plurality of opening rows 81 are aligned in the A direction to form the single opening group 82 as described above, so that the width in the BB' direction of the opening group 82 is greater than the width in the BB' direction of the recording heads 17*a* to 17*c*. Accordingly, the opening group 82 covers an entire ink ejection region in the BB' direction of the recording heads 17*a* to 17*c*, and the ink ejected from all the ink ejection ports 18 in the recording heads 17*a* to 17*c* during flushing passes through the openings 80 in any of the opening groups 82.

(2-2. Pattern of Opening Groups Used for Flushing)

In this embodiment, while the paper P is transported using the first transport belt 8 described above, the control unit 111 drives the recording heads 17*a* to 17*c* to eject ink onto the paper P on the basis of image data transmitted from the outside (e.g., PC), so that it is possible to record an image on the paper P. At this time, the recording heads 17*a* to 17*c* perform flushing between the paper P and the paper P that are to be transported (flushing between sheets of the paper), so that clogging of the ink ejection ports 18 is reduced or prevented.

Herein, in this embodiment, the control unit 111 determines a pattern (combination) in the A direction of the plurality of opening groups 82 that are used during flushing in the one cycle of the first transport belt 8 in accordance with the size of the paper P to be used. The size of the paper P to be used can be recognized by the control unit 111 on the basis of the information stored in the storage unit 28 (e.g., the size information of the paper P input by the operation panel 27*a*).

Figure 7:
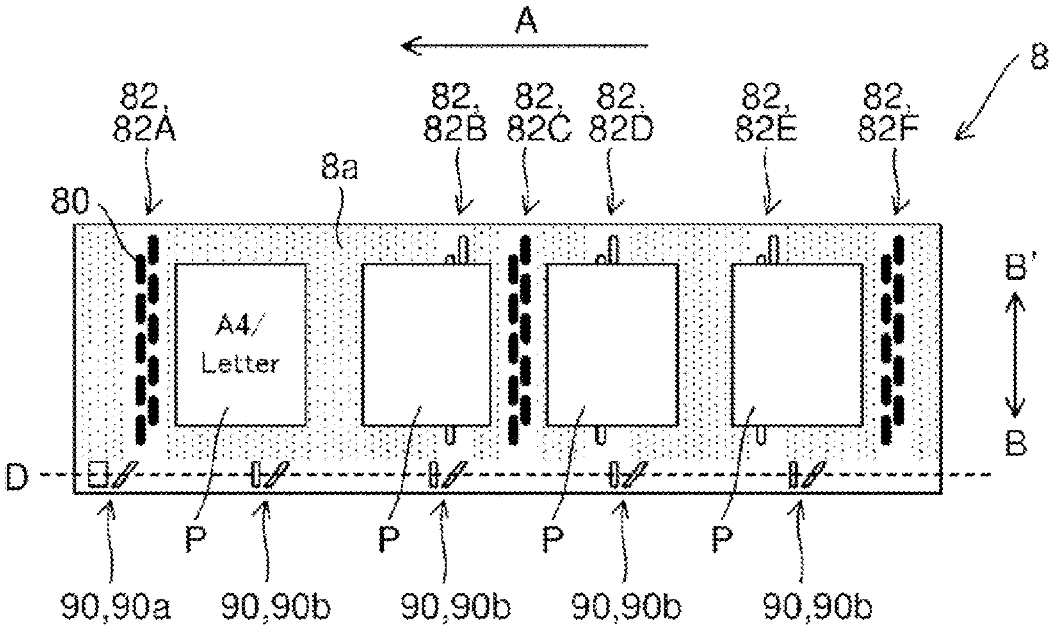
FIG. 7 is an explanatory diagram schematically illustrating an example of a pattern of an opening group for flushing when using the first transport belt of FIG. 6, and paper disposed on the above first transport belt according to the above pattern.
Figure 8:
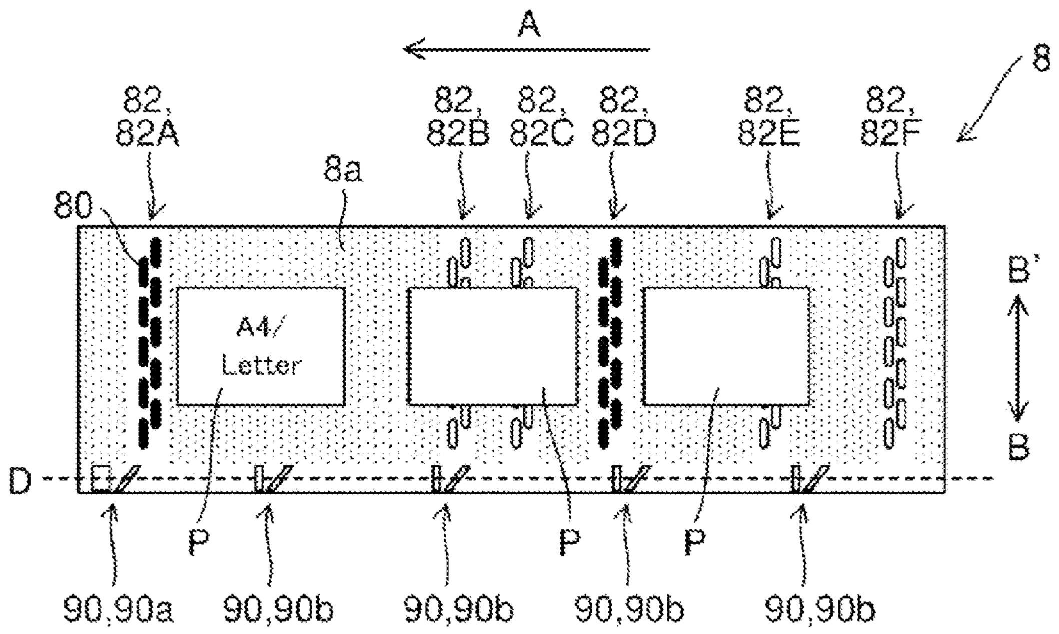
FIG. 8 is an explanatory diagram schematically illustrating another example of the above pattern and paper disposed on the above first transport belt according to the above pattern.
Figure 9:
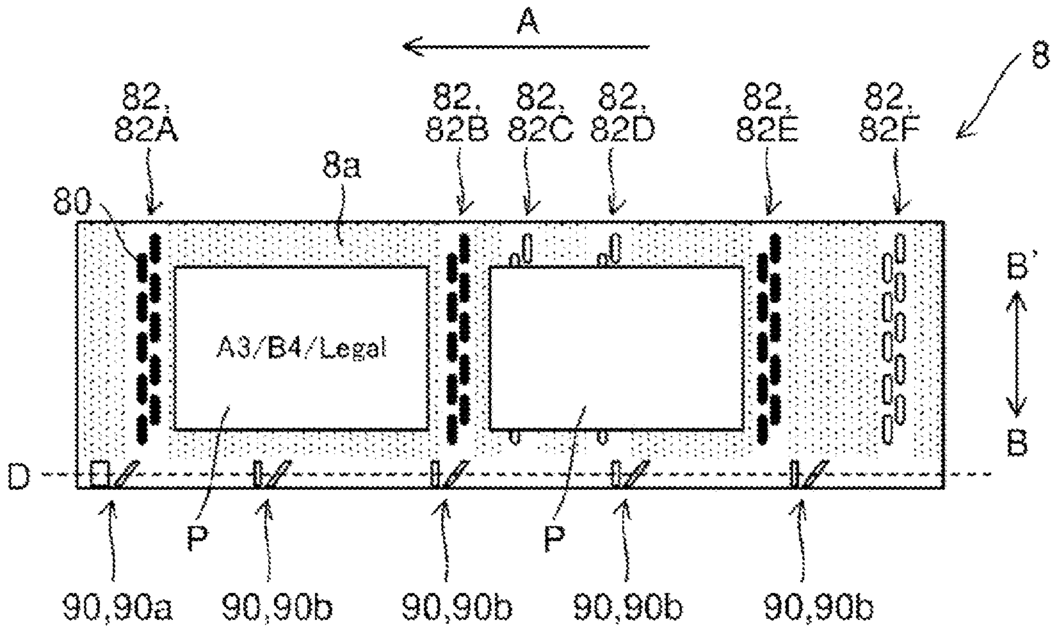
FIG. 9 is an explanatory diagram schematically illustrating still another example of the above pattern and paper disposed on the first transport belt according to the above pattern.
Figure 10:
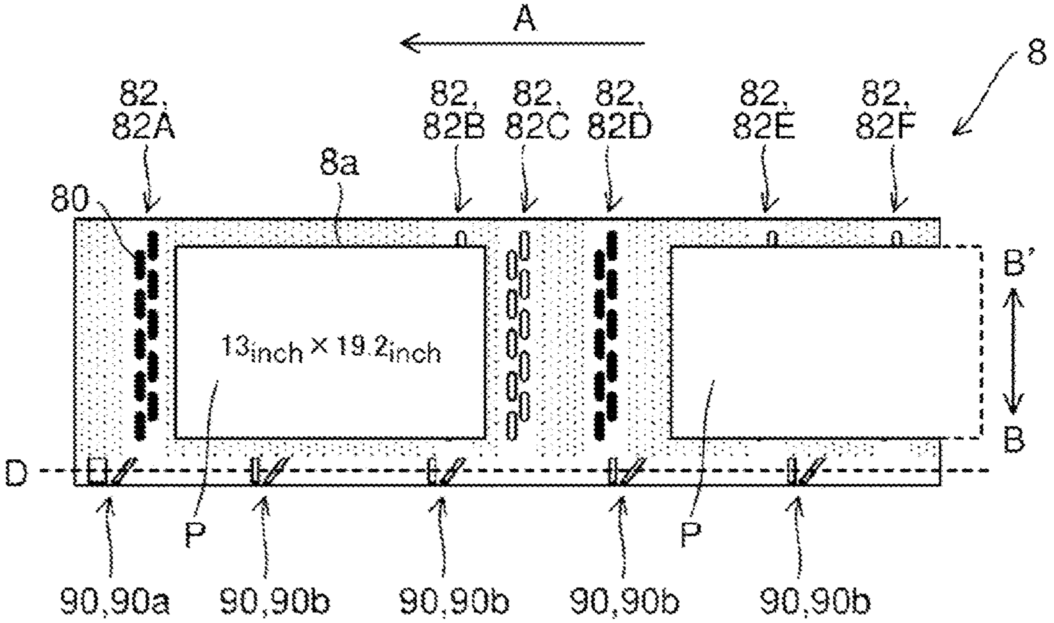
FIG. 10 is an explanatory diagram schematically illustrating still another example of the above pattern and paper disposed on the first transport belt according to the above pattern.

FIG. 7 to FIG. 10 illustrate respective examples of the patterns of the opening groups 82 used for flushing for different sizes of the paper P. For example, in the case where the paper P to be used is in A4 size (horizontally placed) or in letter size (horizontally placed), the control unit 111 selects a pattern of the opening groups 82 illustrated in FIG. 7. That is, of the six opening groups 82 illustrated in FIG. 6, the control unit 111 selects, as the opening groups 82 used for flushing, the opening groups 82A, 82C and 82F. In the case where the paper P to be used is in the A4 size (longitudinally placed) or in the letter size (longitudinally placed), as illustrated in FIG. 8, of the six opening groups 82, the control unit 111 selects, as the opening groups 82 used for flushing, the opening groups 82A and 82D. In the case where the paper P to be used is in A3 size, B4 size, or legal size (longitudinally placed in any of the cases), as illustrated in FIG. 9, of the six opening groups 82, the control unit 111 selects, as the opening groups 82 used for flushing, the opening groups 82A, 82B and 82E. In the case where the paper P to be used is in size of 13 inches×19.2 inches, as illustrated in FIG. 10, of the six opening groups 82, the control unit 111 selects, as the opening groups 82 used for flushing, the opening groups 82A and 82D. In each of the drawings, the openings 80 in the opening groups 82 that belong to the above pattern are illustrated in black for convenience.

Then, the control unit 111 causes the recording heads 17*a* to 17*c* to perform flushing at such timing when the opening groups 82 located in the determined pattern face the recording heads 17*a* to 17*c* due to the movement of the first transport belt 8. Herein, the moving speed of the first transport belt 8 (paper transport speed), the respective intervals of the opening groups 82A to 82E, and the positions of the recording heads 17*a* to 17*c* relative to the first transport belt 8 are all known. Therefore, when the belt sensor 24 or 25 detects that the reference mark 90 (e.g., a reference mark 90*a*, described below) has been passed by the movement of the first transport belt 8, it is found how many seconds the opening groups 82A to 82E passes through such positions as to face the recording heads 17*a* to 17*c* after the detection time. Thus, the control unit 111 can cause the recording heads 17*a* to 17*c* to perform flushing at such timing that the opening groups 82 located in the above-determined pattern face the recording heads 17*a* to 17*c*, on the basis of the detection results by the belt sensor 24 or 25.

In addition, the control unit 111 controls the feed of the paper P to the first transport belt 8 so as to shift the paper P in the A direction from the opening groups 82 located in the determined pattern. That is, the control unit 111 feeds the paper P between the plurality of opening groups 82 aligned in the A direction in the above pattern, on the first transport belt 8 by the resist roller pair 13.

For example, in a case where the paper P to be used is in A4 size (horizontally placed) or in Letter size (horizontally placed), the control unit 111 causes the resist roller pair 13 to feed sheets of the paper P to the first transport belt 8 at specific feed timing such that two sheets of the paper P are placed between the opening group 82A and the opening group 82C, two sheets of the paper P are placed between the opening group 82C and the opening group 82F, and a sheet of the paper P (not illustrated) is placed between the opening group 82F and the (next cycle) opening group 82A on the first transport belt 8, as illustrated in FIG. 7.

In a case where the paper P to be used is in A4 size (longitudinally placed) or in Letter size (longitudinally placed), the control unit 111 causes the resist roller pair 13 to feed sheets of the paper P to the first transport belt 8 at specific feed timing such that two sheets of the paper P are placed between the opening group 82A and the opening group 82D, and two sheets of the paper P are placed between the opening group 82D and the (next cycle) opening group 82A on the first transport belt 8, as illustrated in FIG. 8.

In a case where the paper P to be used is in A3 size, in B4 size or in legal size (longitudinally placed in any of the cases), the control unit 111 causes the resist roller pair 13 to feed sheets of the paper P to the first transport belt 8 at specific feed timing such that a sheet of the paper P is placed between the opening group 82A and the opening group 82B, a sheet of the paper P is placed between the opening group 82B and the opening group 82E, and a sheet of the paper P is placed between the opening group 82E and the (next cycle) opening group 82A on the first transport belt 8, as illustrated in FIG. 9.

In a case where the paper P to be used is in size of 13 inches×19.2 inches, the control unit 111 causes the resist roller pair 13 to feed sheets of the paper P to the first transport belt 8 at specific feed timing such that a sheet of the paper P is placed between the opening group 82A and the opening group 82D, and a sheet of the paper P is placed between the opening group 82D and the (next cycle) opening group 82A on the first transport belt 8, as illustrated in FIG. 10.

That is, as illustrated in FIG. 7 to FIG. 10, the pattern of the opening groups 82 used for flushing is determined in accordance with the size of the paper P to be used, and consequently, the placement pattern of the paper P that is shifted from the opening groups 82 in the A direction is determined.

(2-3. Marks Used for Position Detection)

As described above, in order to feed the paper P to the first transport belt 8 and place the paper P such that the paper P does not overlap the opening groups 82, for example, the belt sensor 25 needs to detect (identifies) the position of the reference opening group 82 (e.g., opening group 82A) in the belt transport direction, and the feed timing of the paper P to the first transport belt 8 needs to be determined on the basis of a detection result, and the paper P needs to be fed from the resist roller pair 13 to the first transport belt 8 at the above feed timing. At this time, in order to detect the position in the belt transport direction of the reference opening group 82, it is necessary to detect the reference position for the one round of the first transport belt 8, which is in a specific positional relation in the transport direction with the above reference opening group (e.g., the opening group 82A). In order to correct meandering in the belt width direction (BB' direction) of the first transport belt 8, it is necessary to detect the meandering amount (displacement amount) in the BB' direction of the first transport belt 8.

Therefore, as illustrated in FIG. 6 to FIG. 10, the first transport belt 8 of this embodiment has a plurality of the marks 90 for position detection at approximately equal intervals in the transport direction (A direction) in an end in the belt width direction (BB' direction). The details of the mark 90 will be described below.

For convenience of description, the mark 90 used to detect the reference position for the one round of the first transport belt 8 among the plurality of marks 90 provided in the A direction is also referred to as a reference mark 90*a*, and the other marks 90 are also referred to as normal marks 90*b*. As an example, it is assumed that the number of the reference marks 90*a* is one, and all the rest are the normal marks 90*b*. Furthermore, the total number of the marks 90 is at least three, including the reference mark 90*a* and the normal marks 90*b* together, for example, five, but is not limited to this number.

<Reference Mark>

<<Configuration Example>>

Figure 11:
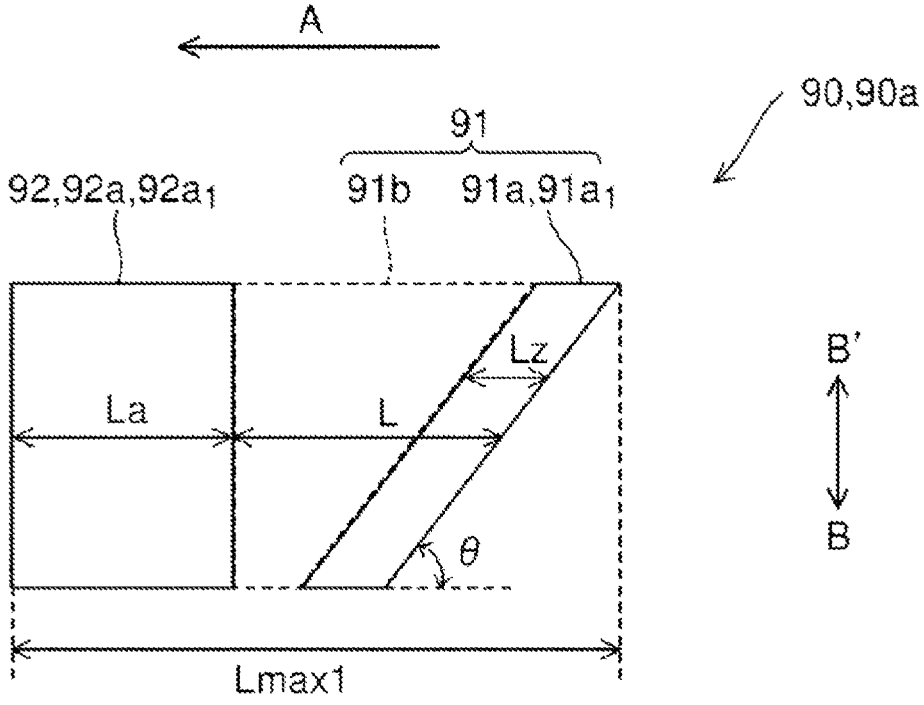
FIG. 11 is a plan view illustrating a configuration example of a reference mark provided on the above first transport belt.

FIG. 11 is a plan view illustrating a configuration example of the reference mark 90*a*. The reference mark 90*a* has a first specific portion 91 and a second specific portion 92. In the first transport belt 8, the first specific portion 91 and the second specific portion 92 are located side by side in the A direction. More particularly, the second specific portion 92 is located on the downstream side in the A direction with respect to the first specific portion 91.

<<First Specific Portion>>

The first specific portion 91 is composed of a first part 91*a* and an isolated region 91*b*. The outline of the first part 91*a* in plan view (viewed from the direction perpendicular to the belt plane of the first transport belt 8) is located parallel to the A direction and has a parallelogram with two sides facing each other in the BB' direction and two other sides each inclined at an angle θ with respect to the A direction in the belt surface. The angle θ may be any angle other than 90°, and may be an acute or obtuse angle. The dimension (width) in the A direction of the first part 91*a* is, for example, Lz (mm). Such a first part 91*a* is composed of a hole 91*a*$_1$ which penetrates the first transport belt 8 in the thickness direction.

The first part 91*a* may have a shape other than a parallelogram. For example, the first part 91*a* may be a rhombic shape with two sides parallel to the A direction and facing each other in the BB' direction and two other sides each inclined at an angle θ with respect to the A direction.

The isolated region 91*b* is composed of a portion of the region of the first transport belt 8. More specifically, the isolated region 91*b* is a belt region between the first part 91*a* and a second part 92*a* of the second specific portion 92, which will be described later, in the A direction. Due to the presence of this isolated region 91*b*, the first part 91*a* and the second part 92*a* are located apart in the A direction. The outline of the second part 92*a* in plan view is a rectangle or a square with two sides intersecting the A direction that are perpendicular to the A direction, as described below. Therefore, the outline of the isolated region 91*b* interposed between the second part 92*a* and the first part 91*a* in the A direction is formed in a trapezoidal shape in which the dimension in the A direction increases from a belt end in the BB' direction toward the inner side of the belt (from the bottom to the top in FIG. 11) in plan view.

As described above, the first part 91*a* is in the shape of a parallelogram in plan view and the isolated region 91*b* is in the trapezoidal shape in plan view, and therefore the first specific portion 91 composed of the first part 91*a* and the isolated region 91*b* added together in the A direction is formed in a trapezoidal shape in which the dimension in the A direction increases from the belt end in the BB' direction toward the inner side of the belt in plan view. That is, the first specific portion 91 can be said to be a region where the dimension in the A direction differs depending on the position in the intersecting direction (for example, BB' direction) that intersects with the A direction. The above intersecting direction may be considered as the direction of an angle θ with respect to the A direction.

<<Second Specific Portion>>

The second specific portion 92 is composed of the second part 92*a*. The second part 92*a* is located side by side with the first part 91*a* of the above-mentioned first specific portion 91 in the A direction on the first transport belt 8 such that the isolated region 91*b* is interposed between the first part 91*a* and the second part 92*a*. The outline of the second part 92*a* in plan view may be a rectangle or a square with two sides parallel in the A direction and facing each other in the BB' direction and two sides located perpendicular to the A direction in the belt plane. Therefore, the second specific portion 92 composed of the second part 92*a* has a constant dimension in the A direction regardless of the position in the BB' direction. Such a second part 92*a* is composed of a hole 92*a*$_1$ that penetrates the first transport belt 8 in the thickness direction, like the first part 91*a*.

<<Another Configuration Example>>

Figure 12:
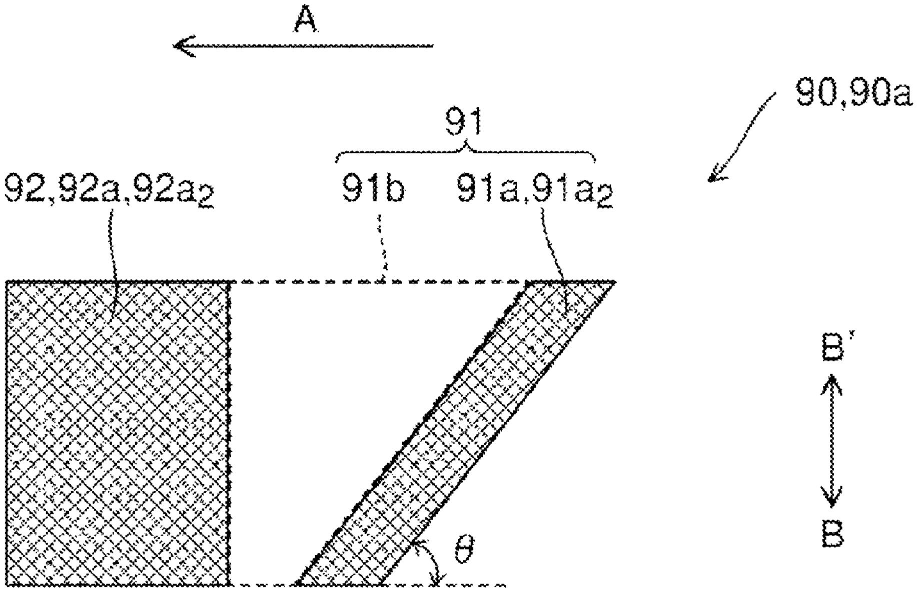
FIG. 12 is a plan view illustrating another configuration example of the above reference mark.

FIG. 12 is a plan view illustrating another configuration example of the reference mark 90*a*. As illustrated in this figure, the first part 91*a* included in the first specific portion 91 of the reference mark 90*a*, and the second part 92*a* composing the second specific portion may be composed of a reflective member 91*a*$_2$ and a reflective member 92*a*$_2$, whose surface reflectance differs from that of the first transport belt 8. The reflective members 91*a*$_2$ and 92*a*$_2$ can be made of seals or paint, for example. Although not illustrated in the figure, one of the first part 91*a* and the second part 92*a* of the reference mark 90*a* may be composed of a hole and the other may be composed of a reflective member.

<Normal Mark>

Figure 13:
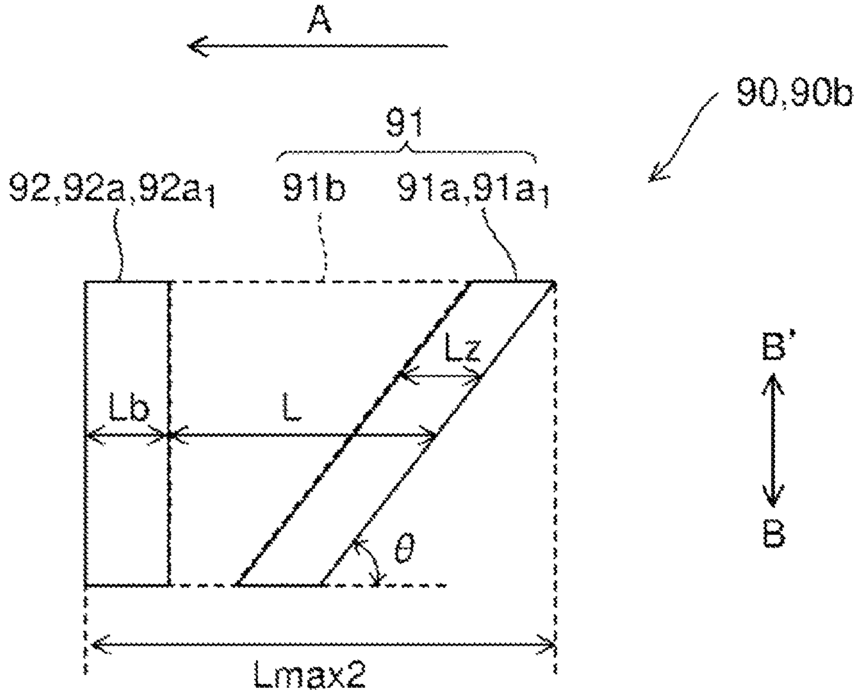
FIG. 13 is a plan view illustrating a configuration example of a normal mark provided on the above first transport belt.

FIG. 13 is a plan view of a configuration example of the normal mark 90*b*. The normal mark 90*b* has the same configuration as the reference mark 90*a* except that the dimension in the A direction of the second part 92*a* that constitutes the second specific portion 92 is different from that of the reference mark 90*a*. That is, where the dimension in the A-direction of the second part 92*a* included in the reference mark 90*a* described above is La (mm), and the dimension in the A-direction of the second part 92*a* included in the normal mark 90*b* is Lb (mm), La≠Lb, especially La>Lb is satisfied. Note that La<Lb may be also satisfied.

In addition, at the same position in the BB' direction, both the reference mark 90*a* and the normal mark 90*b* have the same dimension in the A direction of the first specific portion 91 (for example, both are L (mm)). In addition, the dimension Lb in the A-direction of the normal mark 90*b* is the same as the dimension Lz (mm) in the A-direction of the first part 91*a* of the first specific portion 91, but may be different.

Figure 14:
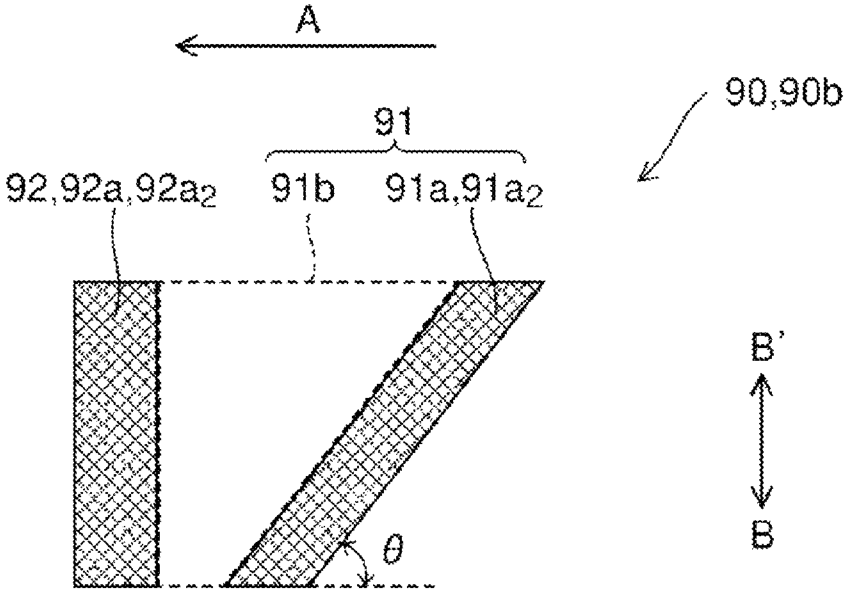
FIG. 14 is a plan view illustrating another configuration example of the above normal mark.

FIG. 14 is a plan view illustrating another configuration of the normal mark 90*b*. Like the reference mark 90*a*, the first part 91*a* included in the first specific portion 91 of the normal mark 90*b* and the second part 92*a* constituting the second specific portion may be composed of reflective members 91*$a_2$* and 92*$a_2$* which are different in surface reflectance from the first transport belt 8. Although not illustrated, one of the first part 91*a* and the second part 92*a* of the normal mark 90*b* may be composed of a hole and the other may be composed of a reflective member.

<Relation Between Marks>

In the reference mark 90*a* and each normal mark 90*b*, the first specific portion 91 and the second specific portion 92 are configured as described above. The respective first specific portions 91 of the reference mark 90*a* and the normal mark 90*b* have the same shape, and therefore the reference mark 90*a* and the normal mark 90*b* have the same maximum dimension in the A direction of the first specific portion 91. Therefore, in a case where the relation of the dimension in the A direction of the second specific portion 92 is, for example, La>Lb (see FIG. 11 and FIG. 13), the maximum dimension Lmax1 (mm) in the A direction of the reference mark 90*a* is longer than the maximum dimension Lmax2 (mm) in the A direction of the normal mark 90*b*. In this embodiment, in the first transport belt 8, the marks 90 are located side by side in the A direction at an interval longer than the maximum dimension Lmax1 in the A direction of the reference mark 90*a* (see FIG. 6).

In a case of La<Lb, in the first transport belt 8, the marks 90 are located side by side in the A direction at an interval longer than the maximum dimension Lmax2 in the A direction of the normal mark 90*b*. That is, in the first transport belt 8, the marks 90 are located side by side in the A direction at an interval longer than the maximum dimension of the mark 90 whose dimension in the A direction is the maximum dimension, of the reference mark 90*a* and the normal marks 90*b*.

(2-4. Detection Method of Reference Position and Detection Method of Meandering Amount)

Now, respective detection methods of a reference position for one round of a belt and a meandering amount in the belt width direction using the first transport belt 8 with marks 90 described above will be described. Herein, it is assumed that the first part 91*a* included in the mark is composed of the hole 91*$a_1$*, the second part 92*a* is composed of the hole 92*$a_1$*, and the belt sensor 25 is composed of a transmissive optical sensor. In a case where the first part 91*a* is composed of the reflective member 91*$a_2$*, the second part 92*a* is composed of the reflective member 92*$a_2$*, it is possible to detect the reference position for the one round of the belt and the meandering amount in the belt width direction by using a reflective optical sensor as the belt sensor 25, in the same manner as the case of using a transmissive optical sensor.

Figure 15:
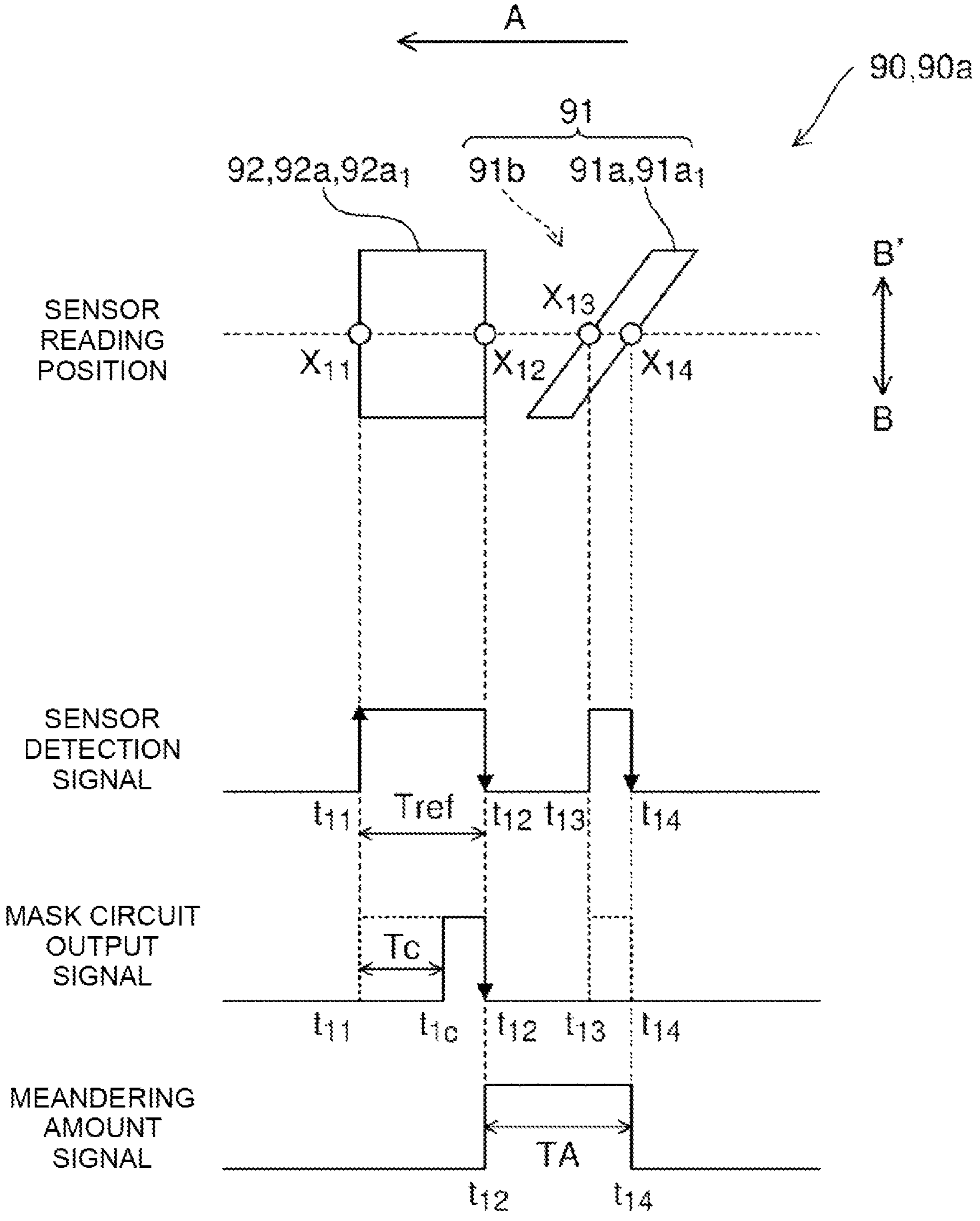
FIG. 15 is an explanatory diagram schematically illustrating a detection signal obtained when a belt sensor reads the above reference mark, an output signal from the above mask circuit, and a meandering amount signal.

FIG. 15 schematically illustrates a detection signal (output signal) from the belt sensor 25, which is obtained when the belt sensor 25 reads an arbitrary position in the BB' direction of the reference mark 90*a* with movement in the A direction of the first transport belt 8, an output signal from the mask circuit 112, a meandering amount signal acquired by the meandering amount calculation unit 114. As the detection signal of the belt sensor 25, a signal that rises at the time point (Time $t_{11}$) of detection of a downstream end $X_{11}$ of the second part 92*a* (hole 92*$a_1$*), falls at the time point (Time $t_{12}$) of detection of an upstream end $X_{12}$ of the second part 92*a*, rises at the time point (Time $t_{13}$) of detection of a downstream end $X_{13}$ of the first part 91*a* (hole 91*$a_1$*), and falls at the time point (Time $t_{14}$) of detection of an upstream end $X_{14}$ of the first part 91*a* is obtained.

When the above detection signal is input to the mask circuit 112, the mask circuit 112 outputs a low level signal from Time $t_{11}$ until the specific period Tc elapses, and outputs the level of the above detection signal with no change at the time point when the specific period Tc elapses (Time $t_{1c}$). In the example of FIG. 15, the period of Time $t_{11}$ to Time $t_{12}$ is longer than the specific period Tc, and therefore the signal of high level is output from the mask circuit 112 until Time $t_{12}$ after the specific period Tc has passed from Time $t_{11}$. In addition, the period of Time $t_{13}$ to Time $t_{14}$ is shorter than the specific period Tc, and therefore all high levels of Time $t_{13}$ to Time $t_{14}$ in the above detection signal are masked. Consequently, after Time $t_{12}$, a low level signal is output from the mask circuit 112.

Figure 16:
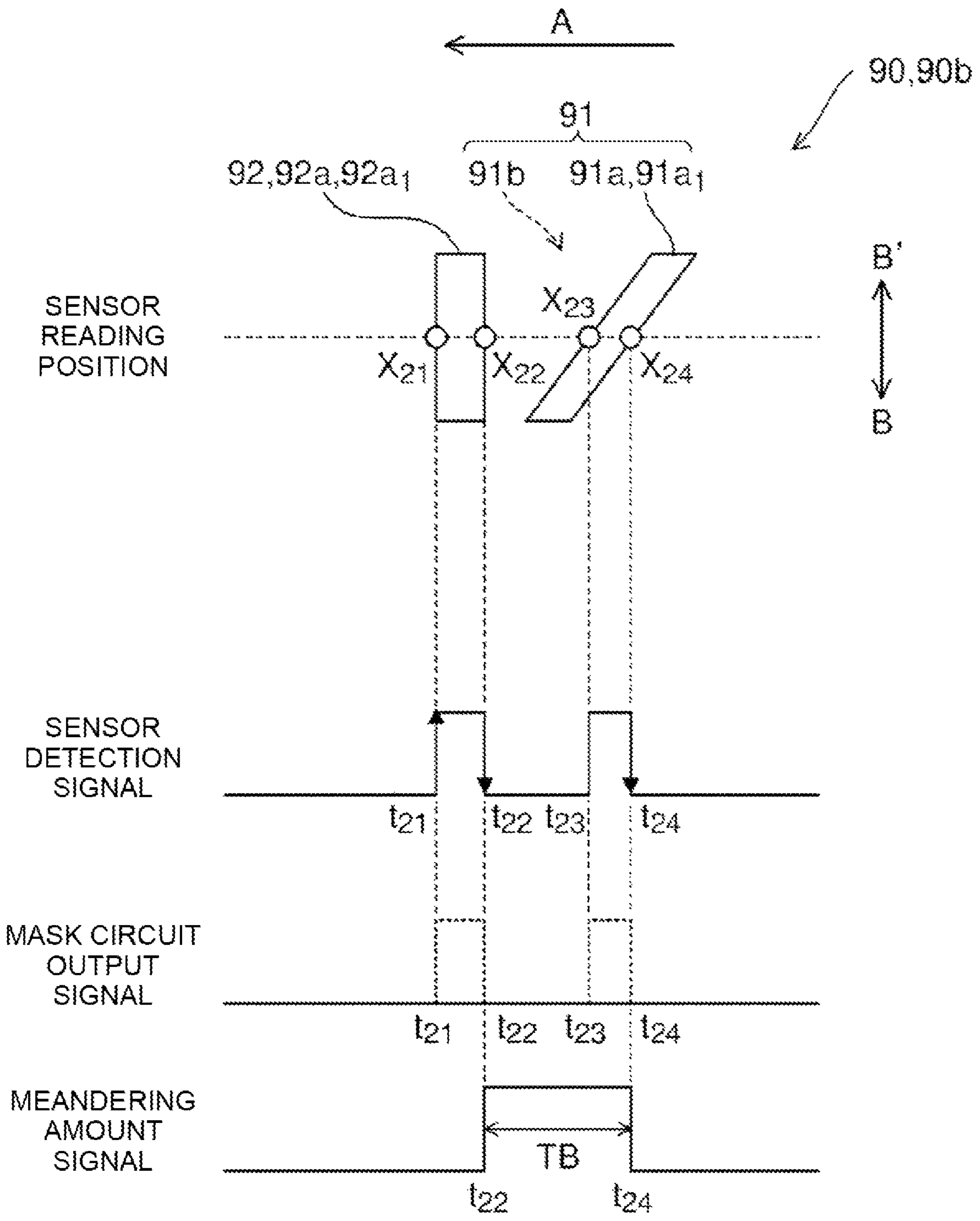
FIG. 16 is an explanatory diagram schematically illustrating a detection signal obtained when the above belt sensor reads the above normal mark, an output signal from the above mask circuit, and a meandering amount signal.

On the other hand, FIG. 16 schematically illustrates a detection signal (output signal) from the belt sensor 25, which is obtained when the belt sensor 25 reads an arbitrary position in the BB' direction of the normal mark 90*b* (the same reading position as that of the reference mark 90*a* in the BB' direction)) with movement in the A direction of the first transport belt 8, an output signal from the mask circuit 112, a meandering amount signal acquired by the meandering amount calculation unit 114. As the detection signal of the belt sensor 25, a signal that rises at the time point (Time $t_{21}$) of detection of a downstream end $X_{21}$ of the second part 92*a* (hole 92*$a_1$*), falls at the time point (Time $t_{22}$) of detection of an upstream end $X_{22}$ of the second part 92*a*, rises at the time point (Time $t_{23}$) of detection of a downstream end $X_{23}$ of the first part 91*a* (hole 91*$a_1$*), and falls at the time point (Time $t_{24}$) of detection of an upstream end $X_{24}$ of the first part 91*a* is obtained.

When the above detection signal is input to the mask circuit 112, the mask circuit 112 outputs a low level signal from Time $t_{21}$ until the specific period Tc elapses, and outputs the level of the above detection signal with no change at the time point when the specific period Tc elapses (Time $t_{2c}$). In the example of FIG. 16, both the period of Time $t_{21}$ to Time $t_{22}$ and the period of Time $t_{23}$ to Time $t_{24}$ are shorter than the specific period Tc, and therefore all high levels of the above detection signal are masked. Consequently, in Time $t_{21}$ to Time $t_{24}$, a low level signal is output from the mask circuit 112.

As illustrated in FIG. 15 and FIG. 16, the output signal of the mask circuit 112 when the belt sensor 25 reads the reference mark 90*a*, and the output signal of the mask circuit 112 when the belt sensor 25 reads the normal mark 90*b* differs from each other. Therefore, the reference position calculation unit 113 can determine whether or not there is a high level signal (especially the down edge) from the output signal of the mask circuit 112, and can determine whether the belt sensor 25 reads the reference mark 90*a*, that is, can determine whether the reference mark 90*a* passes the detection position of the belt sensor 25 by movement of the first transport belt 8. Consequently, the reference position for the one round of the first transport belt 8 can always be detected at the same reference mark 90*a* position.

Thus, when the reference position for the one round of the first transport belt 8 can be detected, assuming that the moving speed of the first transport belt 8 is constant, it is possible to detect that a specific opening group 82 (for example, the opening group 82A) passes the specific position after a specific time passes from the time point of the detection of the reference position. Therefore, the control unit 111 causes the resist roller pair 13 to feed the paper P to the first transport belt 8 such that the paper P is placed on the specific opening group 82 in the positional relation illustrated in FIG. 7 or other figure.

Furthermore, the reference position calculation unit 113 can obtain the reference position for the one round of the first transport belt 8 directly (without using the mask circuit 112) on the basis of the detection signals from the belt sensor 25. For example, the reference position calculation unit 113 can obtain the reference position for the one round of the first transport belt 8 by obtaining the elapsed time Tref ($=t_{12}-t_{11}$) from the time point of the detection of the downstream end $X_{11}$ in the A direction of the second specific portion 92 (second part 92*a*) of the reference mark 90*a* to the time point of the detection of the upstream end $X_{12}$, and determining that the belt sensor 25 reads the reference mark 90*a* in a case where the elapsed time Tref is greater than a preset threshold value Tth (sec).

On the other hand, as to the meandering amount of the first transport belt 8, the meandering amount calculation unit 114 can acquire the meandering amount signal on the basis of the output signal of the belt sensor 25, and obtain the meandering amount on the basis of this meandering amount signal. More details will be described in the following.

For example, the meandering amount signal obtained when the belt sensor 25 reads the normal mark 90*b* is a signal in which a period TB ($=t_{24}-t_{22}$) from the time point (Time $t_{22}$) of the detection of the upstream end $X_{22}$ of the second specific portion 92 (second part 92*a*) of the normal marks 90*b* to the time point (Time $t_{24}$) of the detection of the upstream end $X_{24}$ of the first specific portion 91 (first part 91*a*) is set at a high level, and the other period is set at a low level.

Figure 17:
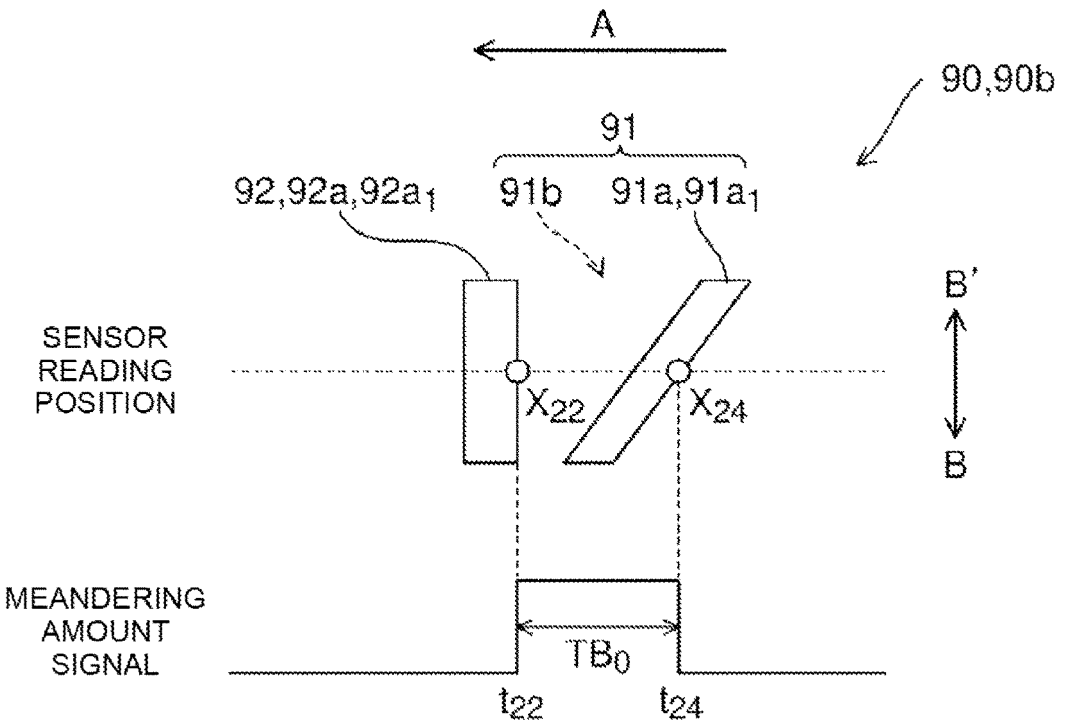
FIG. 17 is an explanatory diagram schematically illustrating a meandering amount signal obtained when the above belt sensor reads the above normal mark at a reference position.

Herein, FIG. 17 schematically illustrates the meandering amount signal obtained when the belt sensor 25 reads the normal mark 90*b* at the reference position in the BB' direction. The position of the above reference corresponds to the position at which the belt sensor 25 read the mark when the first transport belt 8 does not meander in the BB' direction. In the meandering amount signal in FIG. 17, it is assumed that the high level period, that is, the period from the detection of the end $X_{22}$ (Time $t_{22}$) to the detection of the end $X_{24}$ (Time $t_{24}$) is $TB_0$.

Figure 18:
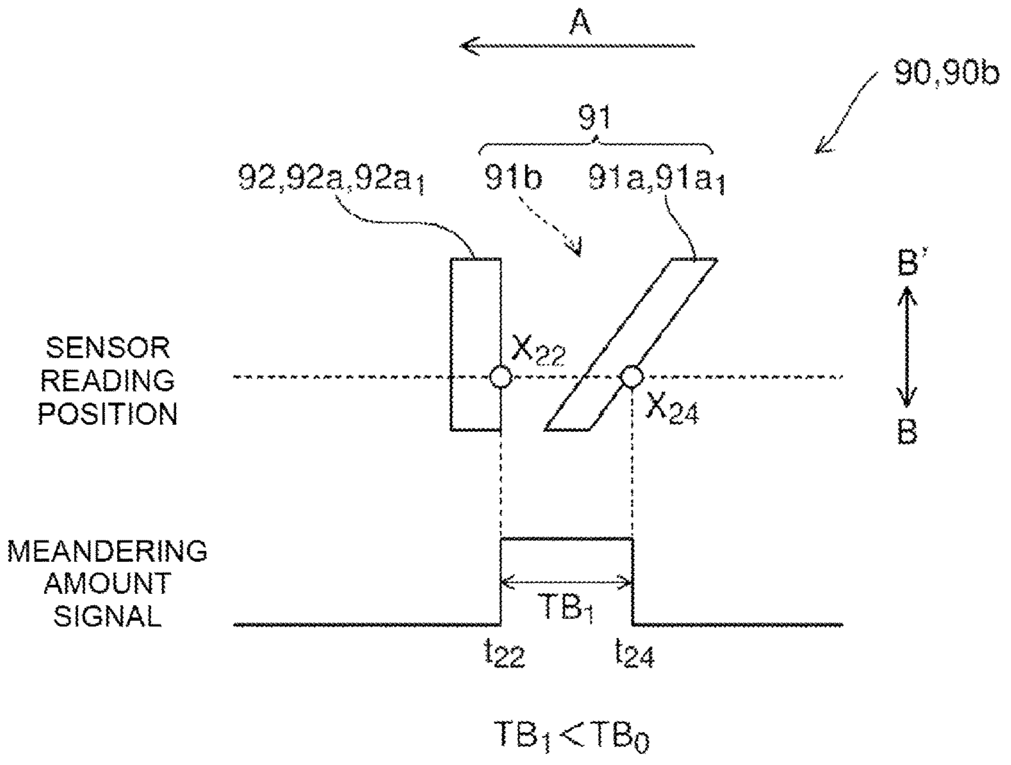
FIG. 18 is an explanatory diagram schematically illustrating a meandering amount signal obtained when the belt sensor reads the above normal mark at a position deviated from the above reference position.

FIG. 18 schematically illustrates the meandering amount signal obtained when the belt sensor 25 reads the normal mark 90*b* on the belt end side (arrow B side of FIG. 17) in the BB' direction with respect to the above reference position due to meandering on the inner side in the BB' direction (arrow B' side in FIG. 17) by the first transport belt 8. In the above meandering amount signal, it is assumed that the high level period, that is, the period from the detection of the end $X_{22}$ (Time $t_{22}$) to the detection of the end $X_{24}$ (Time $t_{24}$) is $TB_1$. The dimension in the A direction of the first specific portion 91 changes depending on the position in the BB' direction, is shorter on the belt end side and longer on the inner side of the belt, so that it is clear that $TB_1<TB_0$ is satisfied.

Figure 19:
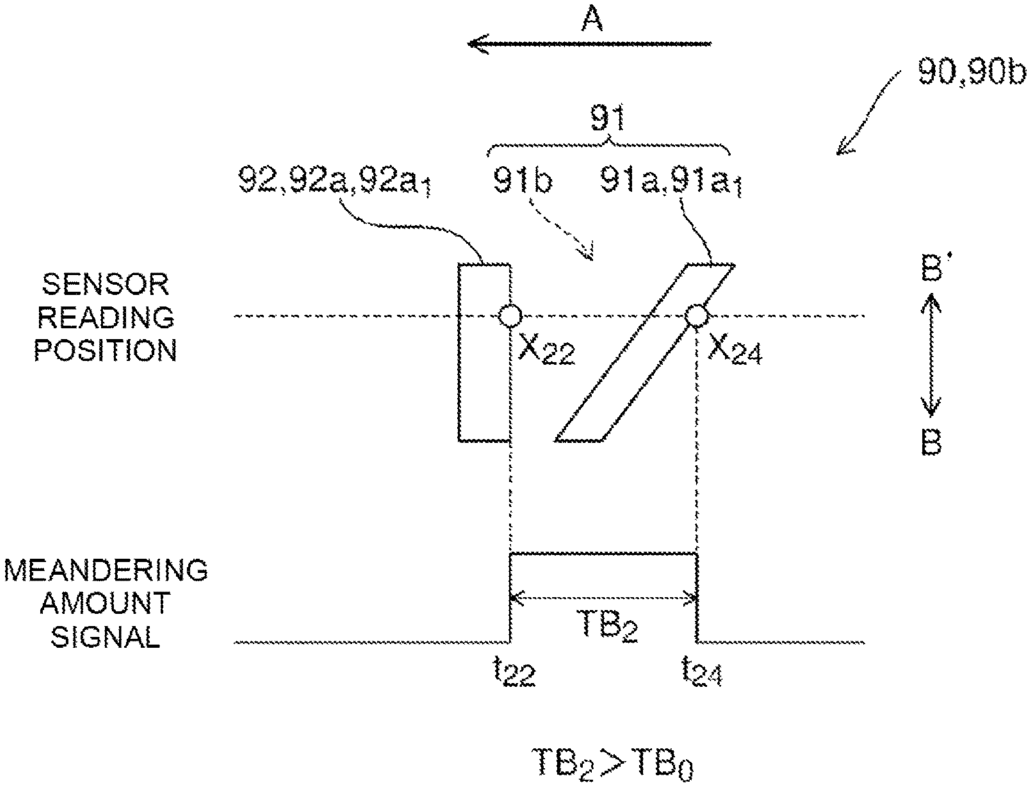
FIG. 19 is an explanatory diagram schematically illustrating a meandering amount signal obtained when the belt sensor reads the above normal mark at another position deviated from the above reference position.

FIG. 19 schematically illustrates the meandering amount signal obtained when the belt sensor 25 reads the normal mark 90*b* on the inner side in the BB' direction with respect to the above reference position due to meandering on the belt end side in the BB' direction by the first transport belt 8. In the above meandering amount signal, it is assumed that the high level period, that is, the period from the detection of the end $X_{22}$ (Time $t_{22}$) to the detection of the end $X_{24}$ (Time $t_{24}$) is $TB_2$. The dimension in the A direction of the first specific portion 91 changes depending on the position in the BB' direction and FIG. 18, in a similar manner to FIG. 18, so that it is clear that $TB_2<TB_0$ is satisfied.

Thus, when meandering in the BB' direction occurs in the first transport belt 8, the length of the period TB that becomes a high level in the meandering amount signal changes according to the meandering amount. Therefore, the meandering amount calculation unit 114 can conversely obtain the meandering amount in the BB' direction of the first transport belt 8 on the basis of the length of the period TB.

In addition, the meandering amount calculation unit 114 can obtain the meandering amount on the basis of the meandering amount signal obtained in a case where the belt sensor 25 reads the reference mark 90*a*. The meandering amount signal obtained when the belt sensor 25 reads the reference mark 90*a* is a signal in which a period TA ($=t_{14}-t_{12}$) from the time point (Time $t_{12}$) of the detection of the upstream end $X_{12}$ of the second specific portion 92 (second part 92*a*) of the reference mark 90*a* to the time point (Time $t_{14}$) of the detection of the upstream end $X_{14}$ of the first specific portion 91 (first part 91*a*) is set at a high level, and the other period is set at a low level (see FIG. 15). The fact that when the first transport belt 8 meanders in the BB' direction, the length of the period TA during which the above meandering amount signal is at a high level changes in accordance with the meandering amount is clear from the fact that the dimension in the A direction of the first specific portion 91 (distance from the end $X_{12}$ to the end $X_{14}$) is shorter on the belt edge side in the BB' direction and is longer on the inner side of the belt, in the reference mark 90*a*, like the normal mark 90*b*.

Therefore, the meandering amount calculation unit 114 can obtain the meandering amount in the BB' direction of the first transport belt 8 on the basis of the length of period TA. That is, regardless of the fact that the dimension in the A direction of the second specific portion 92 of the reference mark 90*a* and the dimension in the A direction of the second specific portion 92 of the normal mark 90*b* are different, it is possible to detect the meandering amount both the position of the normal mark 90*b* and the position of the reference mark 90*a* without considering the difference in the dimension in the A direction.

When the meandering amount of the first transport belt 8 is detected as described above, the meandering correction mechanism 30 can correct the meandering of the first transport belt 8 on the basis of the above meandering amount.

3. Effects

As described above, the first transport belt 8 of this embodiment has a plurality of the marks 90 for position detection in the A direction as the transport direction of the first transport belt 8. Each of the plurality of marks 90 has the first specific portion 91 with the different dimension in the A direction depending on the position in the intersecting direction (e.g., the BB' direction) that intersects the A direction. Consequently, the belt sensor 25 can detect the meandering amount in the intersecting direction of the first transport belt 8 on the basis of the detection signal obtained by reading each first specific portion 91 in the A direction.

In addition, a plurality of the marks 90 having the first specific portions 91 exist in the A direction in the first transport belt 8, and therefore even when the total circumferential length of the first transport belt 8 is long, the meandering amount of the first transport belt 8 can be finely detected in the A direction on the basis of the detection signal of the first specific portion 91 of each mark 90. As a result, even when the total circumferential length of the first transport belt 8 is long, it is possible to precisely correct the meandering.

In addition, each of the plurality of marks 90 has the second specific portion 92 whose dimension in the A direction is constant regardless of the position in the intersecting direction. The plurality of marks 90 each include the reference mark 90*a* whose dimension in the A direction of the second specific portion 92 is different from that of each of the other normal marks 90*b*. Consequently, regardless of the presence or absence of meandering in the intersecting direction of the first transport belt 8 and the magnitude of the meandering amount, for example, whether the read mark 90 is the reference mark 90*a* or the other normal mark 90*b* can be detected on the basis of the detection signals obtained by reading the second specific portions 92 in the A direction by the belt sensor 25. Then, it is possible to detect the reference position for the one round of the first transport belt 8 by detecting the reference mark 90*a*.

Each mark 90 has both the first specific portion 91 and the second specific portion 92, so that just by making the dimensions in the A direction of the second specific portions 92 different while making the shapes (outline) of the first specific portions 91 of the reference mark 90*a* and each normal mark 90*b* common, the detection of the reference position for the one round of the first transport belt 8, and the detection of the meandering amount of the first transport belt 8 can be performed at the reference position of each mark 90 as described above. Therefore, the first transport belt 8 suitable for each detection described above can be realized with a simple configuration.

In each marks 90, the first specific portion 91 and the second specific portion 92 are located side by side in the A direction. Consequently, with the movement in the A direction by the first transport belt 8, the detection of the meandering amount based on reading of the first specific portion 91, and the detection of the reference position based on reading of the second specific portion 92 can be continuously performed.

Further, in each mark 90, the second specific portion 92 is located on the downstream in the A direction with respect to the first specific portion 91. Consequently, at the position of each mark 90, the reference position detection based on the reading of the second specific portion 92 can be performed first, and then, the meandering amount detection based on the reading of the first specific portion 91 can be performed.

In addition, at the same position in the intersecting direction that intersects with the A direction, that is, at the same reading position of the belt sensor 25, one (for example, the end $X_{12}$) of two points at opposite ends (for example, the end $X_{12}$ and the end $X_{14}$) in the A direction of the first specific portion 91, and one (for example, the end $X_{12}$) of two points at opposite ends (for example, the end $X_{11}$ and the end $X_{12}$) in the A direction of the second specific portion 92 are the same point. In this configuration, when the opposite ends in the A direction of each of the first specific portion 91 and the second specific portion 92 are read, a total of three points only need to be read at the same position in the intersecting direction (the end $X_{11}$, the end $X_{12}$, the end $X_{14}$). In this case, compared to a configuration of reading a total of four points, two opposite ends in the A direction of the first specific portion 91 and two opposite ends in the A direction of the second specific portion 92, at different timings, for example, like a configuration in which the first specific portion 91 and the second specific portion 92 are separated in the A direction through another region, the number of reading points (number of times) is reduced. Consequently, It is possible to quickly and easily perform a process based on the reading of the belt sensor 25 (the detection of the reference position for the one round of the first transport belt 8 and the detection of the meandering amount).

In the first transport belt 8, the marks 90 are located apart in the A direction. In addition, the interval between the marks 90 adjacent to each other in the A direction is longer than the maximum dimension in the A direction of the mark (for example, the reference mark 90*a*) having the maximum dimension among all the marks 90. In this configuration, the detection signal of the mark 90 on the downstream side and the detection signal of the mark 90 on the upstream side in the A direction by the belt sensor 25 can be reliably distinguished as separate detection signals of the marks 90. That is, it is possible to reliably avoid a situation where the detection signals of the marks 90 adjacent in the A direction interfere with each other and become indistinguishable. Therefore, it is possible to reliably detect the reference position for the one round and the meandering amount of the first transport belt 8 on the basis of the detection signal of each mark 90.

Also, in each of the reference mark 90*a* and each normal mark 90*b*, the dimension in the A direction of the first specific portion 91 lengthens from one side to the other side (for example, from the end side of the belt to the inner side of the belt) in the direction intersecting the A direction. In this case, it is possible to reliably detect the meandering amount of the first transport belt 8 on the basis of the detection signal (for example, the length of the high-level detection period) obtained by reading each first specific portion 91 in the A direction by the belt sensor 25.

Each of the plurality of marks 90 includes the first part 91*a* and the second part 92*a* located side by side in the A direction with a part of the first transport belt 8 interposed as the isolated region 91*b*. The first part 91*a* is composed of the hole 91$a_1$ or the reflective member 91$a_2$. In addition, the second part 92*a* is composed of the hole 92$a_1$ or the reflective member 92$a_2$. The first specific portion 91 is composed of the isolated region 91*b* and the first part 91*a*. The second specific portion 92 is composed of the second part 92*a*.

Thus, the first specific portion 91 can be reliably realized by using both the isolated region 91*b* composed of a part of the first transport belt 8, and the first part 91*a* composed of the hole 91$a_1$ or the reflective member 91$a_2$. In addition, the second specific portion 92 can be reliably realized by the single second part 92*a* composed of the hole 92$a_1$ or the reflective member 92$a_2$.

In each mark 90, the dimension in the A direction of the second specific portion 92 is defined by the dimension in the A direction of the second part 92*a* at any position in the intersecting direction that intersects with the A direction. For example, in the reference mark 90*a*, the dimension in the A direction of the second specific portion 92 is defined by the dimension La in the A direction of the second part 92*a*. In each normal mark 90*b*, the dimension in the A direction of the second specific portion 92 is defined by the dimension Lb in the A direction of the second part 92*a*. The dimensions La and Lb are different, and the dimension Lb is the same as, for example, the dimension Lz in the A direction of the first part 91*a*. For this, it can be said that the dimension La in the A direction of the second specific portion 92 of the reference mark 90*a* is different from the dimension Lb in the A direction of the second part 92*a* of each of the other normal marks 90*b*, and is different from the respective dimensions Lz in the A direction of the first parts 91*a* of all the marks 90.

In this configuration, the belt sensor 25 can detect the second part 92*a* of the reference mark 90*a* so as to distinguish the second part 92*a* of the reference mark 90*a* from the second parts 92*a* of the normal marks 90*b* and the first parts 91*a* of all the marks 90. Consequently, it becomes easy to detect the reference position for the one round of the first transport belt 8 on the basis of the detection signal of belt sensor 25.

In particular, in a configuration in which the dimensions Lb in the A direction of the second parts 92*a* of the other normal marks 90*b* other than the reference mark 90*a* are the same as the dimensions Lz in the A direction of the first parts 91*a* of all the marks 90, the belt sensor 25 can perform detection such that the second part 92*a* of the reference mark 90*a* is clearly distinguished from the other parts (for example, the second parts 92*a* of the normal marks 90*b*, and the first parts 91*a* of all the marks 90). Consequently, it becomes easier to detect the reference position for the one round of the first transport belt 8 on the basis of the detection signal of belt sensor 25. For example, as described above, it is determined whether the belt sensor 25 detects the reference mark 90*a* only by comparing the detection period of the second part 92*a* with the threshold value (comparison between the elapsed time Tref and the threshold value Tth), the reference position for the one round of the first transport belt 8 can be detected, and the detection become much easier.

The printer 100 as the recording device of this embodiment includes the above first transport belt 8, and an image is recorded on the paper P as a recording medium by using the above first transport belt 8. In this case, in the printer 100 that records an image on the paper P by ink injection, it is possible to detect the reference position for the one round of the first transport belt 8, and realize a configuration in which the meandering amount in the intersecting direction is detected.

In particular, the printer 100 of this embodiment includes the recording heads 17*a* to 17*c* each having a plurality of the nozzles (ink ejection ports 18) which eject ink, the belt sensor 25 as an optical sensor that detects the plurality of marks 90 provided in the first transport belt 8, the reference position calculation unit 113, and the control unit 111, in addition to the above first transport belt 8. The first transport belt 8 transports the paper P to a position facing the recording heads 17*a* to 17*c*, and has openings 80 for allowing passing of ink ejected at the time of flushing from the recording heads 17*a* to 17*c*, or the opening groups 82 including the openings 80, at a plurality of locations in the A direction at irregular intervals, in addition to the above plurality of marks 90.

In such a configuration, the reference position calculation unit 113 obtains the reference position for the one round of the first transport belt 8 on the basis of the detection results of the plurality of marks 90 by the belt sensor 25. Then, the control unit 111 detects (identifies) the positions of the openings 80 (opening groups 82) to be used for flushing on the basis of the above reference position obtained by the reference position calculation unit 113, and causes the recording heads 17*a* to 17*c* to perform flushing at the timing when the identified openings 80 (opening groups 82) face the recording heads 17*a* to 17*c* by movement of the first transport belt 8.

The ink ejected from the recording heads 17*a* to 17*c* during the flushing passes through the openings 80, and therefore the effect of flushing (effects of the prevention of nozzle clogging due to drying of ink) can be obtained without staining the first transport belt 8 with the above ink. In addition, the first transport belt 8 has the openings 80 (opening groups 82) at the plurality of locations in the A direction at the irregular intervals, so that it is possible to select the openings 80 to be used during the flushing depending on the size of the paper P to be used. Therefore, it is possible to identify the positions of the openings 80 in accordance with the size of the paper P to be used on the basis of the above reference position, and perform flushing.

The printer 100 of this embodiment further includes the resist roller pair 13 as the recording medium feed unit that feeds the paper P to the first transport belt 8. Then, the control unit 111 controls the resist roller pair 13 such that the paper P is placed so as to have specific positional relation in the A direction with the identified openings 80 (opening groups 82) (for example, the paper P is placed so as to shift on the upstream side in the transport direction with respect to the openings 80), and the paper P is fed to the first transport belt 8 (see FIG. 7 to FIG. 10). In such control, it is possible to perform flushing for the openings 80 before recording an image on the paper P fed to and placed on the first transport belt 8 by the resist roller pair 13, by ink ejection. Consequently, after flushing, an image having good quality can be recorded on the paper P by the ink ejection.

The printer 100 of this embodiment includes the mask circuit 112 that extracts and outputs only a signal equal to or longer than a specific period from the detection signals of the plurality of marks 90 output from the belt sensor 25. Then, the reference position calculation unit 113 obtains the reference position for the one round of the first transport belt on the basis of the signal output from the mask circuit 112. By using the mask circuit 112, it is possible to extract only the signal necessary for detecting the reference position from the detection signals of the belt sensor 25, and therefore it is possible to facilitate the detection of the reference position (on the basis of the electrical signal).

In the printer 100 of this embodiment, the meandering amount calculation unit 114 obtains the meandering amount of the first transport belt 8 on the basis of the detection results of the plurality of marks 90 by the belt sensor 25. Then, the meandering correction mechanism 30 corrects meandering of the first transport belt 8 on the basis of the above meandering amount obtained by the meandering amount calculation unit 114. With the configuration of each mark 90 described above, the meandering amount of the first transport belt 8 can be obtained appropriately. Therefore, the meandering correction mechanism 30 can appropriately correct meandering of the first transport belt 8 on the basis of the above meandering amount.

4. Modification

Figure 20:
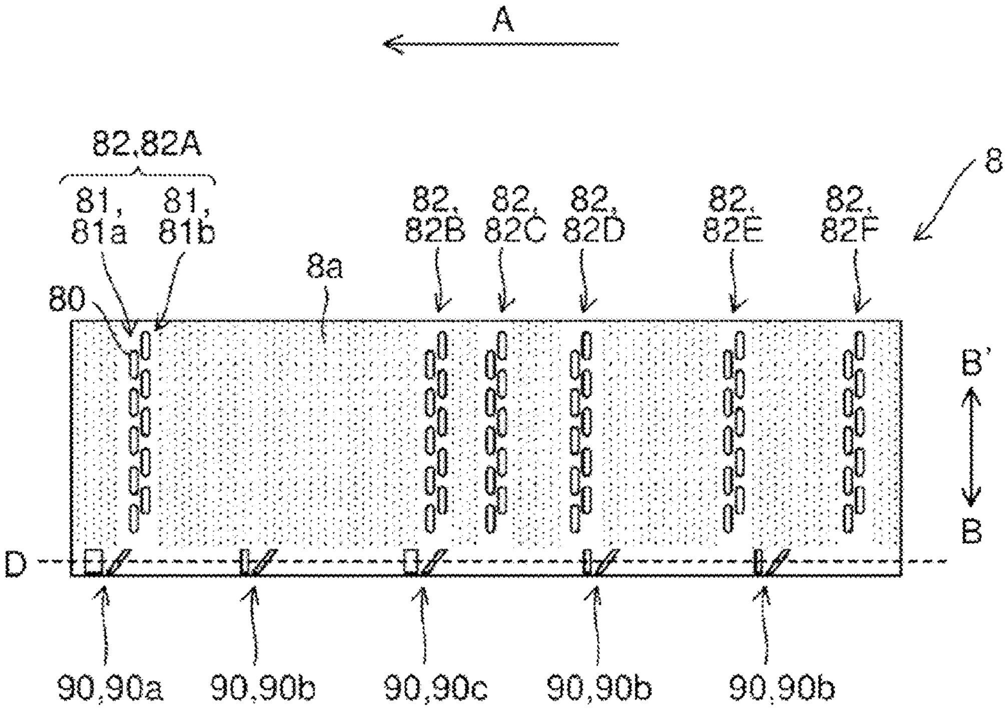
FIG. 20 is a plan view illustrating another configuration example of the above first transport belt.

FIG. 20 is a plan view illustrating another configuration example of the first transport belt 8. In the first transport belt 8 illustrated in FIG. 20, in a configuration in which the plurality of marks 90 are located at three or more location in the A direction, another reference mark 90*c* is provided in addition to the reference mark 90*a*.

Figure 21:
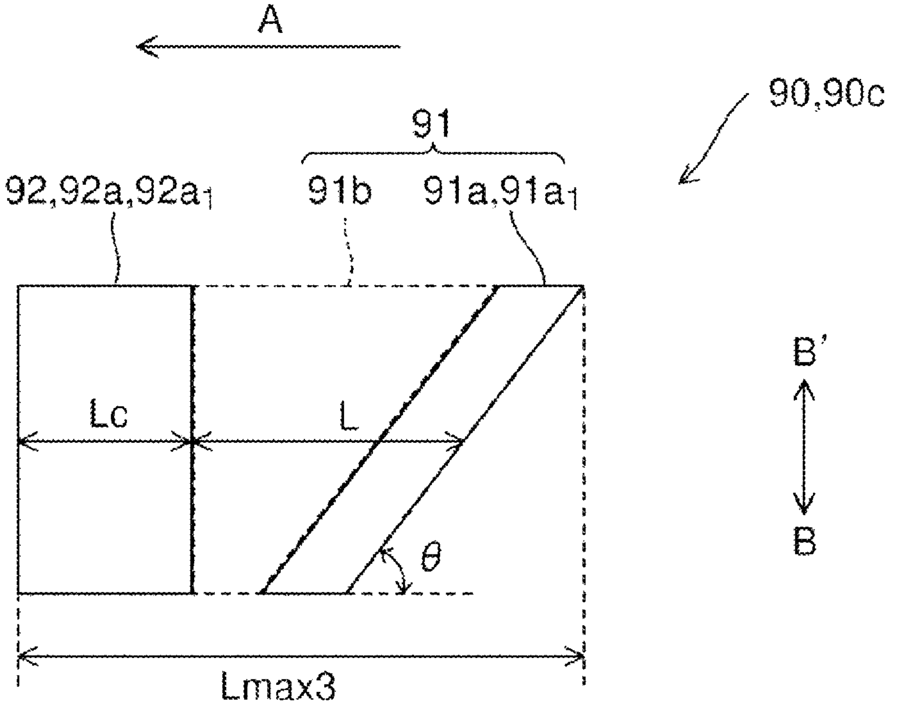
FIG. 21 is a plan view illustrating a configuration example of another reference mark.

FIG. 21 is a plan view illustrating a configuration example of another reference mark 90*c*. The reference mark 90*c* has the same configuration as the reference mark 90$a$, except that the dimension Lc (mm) in the A direction of a second part 92$a$ that constitutes a second specific portion 92 is different from that of the reference mark 90$a$. For example, the dimension Lc in the A direction of the second part 92$a$ of the reference mark 90$c$ is set so as to satisfy Lb<Lc<La. As a result, where the maximum dimension in the A direction of the reference mark 90$c$ denotes Lmax3 (in the unit of mm), Lmax2<Lmax3<Lmax1 is satisfied. The magnitude relation between Lc and La and the magnitude relation between Lmax3 and Lmax1 may be reversed.

Thus, the following effects can be obtained by including a plurality of the reference marks 90$a$ and 90$c$ having mutually different dimensions in the A direction of the second specific portions 92 in the plurality of marks 90 provided on the first transport belt 8. That is, for example, it is possible to detect a reference position for one round of the first transport belt 8 on the basis of a detection signal obtained by reading the reference mark 90$a$ by the belt sensor 25, detect a position of a specific opening group 82 (for example, the opening group 82A) on the basis of the detection result. In addition, it is possible to detect another reference position for the one round of the first transport belt 8 on the basis of a detection signal obtained by reading the reference mark 90$c$ by the belt sensor 25, and detect a position of another opening group 82 (for example, the opening group 82B) on the basis of the detection results. Therefore, even in a case where the reference opening group 82 for placement differs depending on the size of the paper P to be used, it is possible to feed and place the paper on the first transport belt 8 such that the paper P is placed in specific positional relation with the reference opening group 82 according to the size of the paper P.

In the first transport belt 8, in addition to the reference marks 90$a$ and 90$c$, one or more reference marks may be further provided. That is, in the first transport belt 8, a total of three or more reference marks having mutually different dimensions in the A direction of second specific portions 92 may be provided.

5. Others

In each mark 90 of the first transport belt 8 described above, the first specific portion 91 may include a region having the same dimension in the A direction regardless of the position in the intersecting direction. In this case, a portion except the above region in the first specific portion 91 substantially constitutes the first specific portion 91 whose dimension in the A direction differs depending on the position in the intersecting direction.

In this embodiment, all the marks 90 have the same maximum dimension in the A direction of the first specific portion 91. However, one or some marks 90 may have different maximum dimensions in the A direction of the first specific portion 91 from the other marks 90.

In this embodiment, the configuration in which the first transport belt 8 mounted on the printer 100 as an inkjet recording device is provided with a plurality of the marks 90. However, the plurality of marks 90 described in this embodiment can be also applied to a belt of other recording device. For example, in an intermediate transfer belt of a color copier, it is necessary to detect the meandering amount in order to correct meandering of the intermediate transfer belt. In addition, in order to transfer each color toner image to the same position during calibration, the reference position for the one round of detection of the intermediate transfer belt may be detected. By applying the plurality of marks 90 described in this embodiment to an intermediate transfer belt of an image forming apparatus (recording device) such as a copier, both detection of the reference position for the one round of the intermediate transfer belt and meandering amount of the intermediate transfer belt can be performed.

In the above description, the case where the paper P is sucked to the first transport belt 8 by negative pressure suction and transported. However, the first transport belt 8 may be charged and the paper P may be electrostatically attached to the first transport belt 8 and transported (electrostatic attachment method). Also in this case, it is possible to apply a configuration in which the plurality of marks 90 are provided on the first transport belt 8.

The above describes the example in which the color printer that records a color image using four-color ink is used as the inkjet recording device, but even in a case where a monochrome printer that records a monochrome image using black ink is used, the configuration of this embodiment (especially the configuration of a plurality of the marks 90 are provided on the first transport belt 8) can be applied.

INDUSTRIAL APPLICABILITY

A recording device belt of the present invention can be used for a paper transport belt used for an inkjet printer, or an intermediate transfer belt used for an image forming apparatus such as a copier.

DESCRIPTION OF REFERENCE NUMERALS

8 first transport belt (belt)
13 resist roller pair (recording medium feed unit)
17$a$ to 17$c$ recording head
18 ink ejection port (nozzle)
25 belt sensor (optical sensor)
30 meandering correction mechanism
80 opening
90 mark
90$a$ reference mark
90$b$ normal mark (other mark)
90$c$ reference mark
91 first specific portion
91$a$ first part
91$a_1$ hole
91$a_2$ reflective member
91$b$ isolated region
92 second specific portion
92$a$ second part
92$a_1$ hole
92$a_2$ reflective member
100 printer (recording device)
111 control unit
112 mask circuit
113 reference position calculation unit
114 meandering amount calculation unit

The invention claimed is:

1. A recording device belt comprising
a plurality of marks for belt position detection disposed in a transport direction of the belt, wherein
each of the plurality of marks has:
a first specific portion whose dimension in the transport direction differs depending on a position in an intersecting direction intersecting the transport direction; and a second specific portion whose dimension in the transport direction is constant regardless of the position in the intersecting direction, and the plurality of marks include a reference mark whose dimension in the transport direction of the second specific portion is different from that of the other marks in the plurality of marks.

2. The recording device belt according to claim 1, wherein in each of the marks, the first specific portion and the second specific portion are located side by side in the transport direction.

3. The recording device belt according to claim 2, wherein in each of the marks, the second specific portion is located on a downstream side in the transport direction with respect to the first specific portion.

4. The recording device belt according to claim 1, wherein at the same position in the intersecting direction, one of two points at opposite ends in the transport direction of the first specific portion, and one of two points at opposite ends in the transport direction of the second specific portion are the same point.

5. The recording device belt according to claim 1, wherein the marks are located apart in the transport direction, and an interval between the marks adjacent to each other in the transport direction is longer than a maximum dimension in the transport direction of a mark having the maximum dimension in the transport direction among all the marks.

6. The recording device belt according to claim 1, wherein the dimension in the transport direction of the first specific portion lengthens from one side to the other side in the intersecting direction.

7. The recording device belt according to claim 1, wherein the plurality of marks are located at three or more locations in the transport direction, and include a plurality of the reference marks, and the plurality of reference marks have the second specific portions whose dimensions in the transport direction are different from each other.

8. The recording device belt according to claim 1, wherein the plurality of marks each include a first part and a second part located side by side in the transport direction with a part of the belt interposed as an isolated region, the first part and the second part are each composed of a hole or a reflective member, the first specific portion is composed of the isolated region and the first part, and the second specific portion is composed of the second part.

9. The recording device belt according to claim 8, wherein at an arbitrary position in the intersecting direction, the dimension in the transport direction of the second specific portion is defined by a dimension in the transport direction of the second part, and the dimension in the transport direction of the second specific portion of the reference mark is different from the dimension in the transport direction of the second part of the other marks and the respective dimensions in the transport direction of the first parts of all the marks.

10. The recording device belt according to claim 9, wherein the dimension in the transport direction of the second part of the other marks and the respective dimensions in the transport direction of the first parts of all the marks are the same.

11. A recording device comprising the belt according to claim 1, wherein an image is recorded on a recording medium by using the belt.

12. The recording device according to claim 11, comprising a recording head having a plurality of nozzles which eject ink;

a transport belt as the belt, which transports the recording medium to a position facing the recording head, and has openings for allowing passing of the ink when the recording head performs flushing of ejecting the ink at timing different from timing of contributing to image formation on the recording medium, at a plurality of locations in the transport direction at an irregular interval;

an optical sensor that detects the plurality of marks provided on the transport belt;

a reference position calculation unit that obtains a reference position for one round of the transport belt on the basis of detection results of the plurality of marks by the optical sensor; and a control unit that controls ejection of the ink in the recording head, wherein the control unit identifies a position of the opening to be used for the flushing, on the basis of the reference position for the one round of the transport belt obtained by the reference position calculation unit, and the flushing is performed for the recording head at timing when the identified opening faces the recording head by movement of the transport belt.

13. The recording device according to claim 12, further comprising a recording medium feed unit that feeds the recording medium to the transport belt, wherein the control unit causes the recording medium feed unit to feed the recording medium to the transport belt such that the recording medium is placed in specific positional relation in the transport direction with the identified opening.

14. The recording device according to claim 12, comprising a mask circuit that extracts and outputs only a signal equal to or longer than a specific period from detection signals of the plurality of marks output from the optical sensor, and the reference position calculation unit obtains the reference position for the one round of the transport belt on the basis of the signal output from the mask circuit.

15. The recording device according to claim 12, further comprising a meandering amount calculation unit that obtains a meandering amount in the intersecting direction of the transport belt on the basis of detection results of the plurality of marks by the optical sensor; and a meandering correction mechanism that corrects meandering of the transport belt on the basis of the meandering amount obtained by the meandering amount calculation unit.

* * * * *